(12) United States Patent
Bae et al.

(10) Patent No.: US 10,205,807 B2
(45) Date of Patent: Feb. 12, 2019

(54) ELECTRONIC DEVICE HAVING UNIBODY HOUSING AND METHOD OF MANUFACTURING THE SAME

(71) Applicant: Samsung Electronics Co., Ltd., Gyeonggi-do (KR)

(72) Inventors: Seungjae Bae, Gyeonggi-do (KR); Taedoo Choung, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/351,055

(22) Filed: Nov. 14, 2016

(65) Prior Publication Data

US 2017/0142239 A1 May 18, 2017

(30) Foreign Application Priority Data

Nov. 13, 2015 (KR) ........................ 10-2015-0159534

(51) Int. Cl.
*G06F 1/16* (2006.01)
*H05K 7/00* (2006.01)
*H04M 1/02* (2006.01)

(52) U.S. Cl.
CPC ........ *H04M 1/0202* (2013.01); *G06F 1/1626* (2013.01); *G06F 1/1635* (2013.01); *G06F 1/1656* (2013.01); *G06F 1/1658* (2013.01); *G06F 1/1698* (2013.01)

(58) Field of Classification Search
CPC ....................................................... H05K 5/00
USPC .................................................... 361/679.01
See application file for complete search history.

(56) References Cited

U.S. PATENT DOCUMENTS

| | | |
|---|---|---|
| 2009/0280340 A1 | 11/2009 | Lee et al. |
| 2011/0186345 A1* | 8/2011 | Pakula ................. G06F 1/1626 174/520 |
| 2011/0234063 A1 | 9/2011 | Li et al. |
| 2012/0118628 A1 | 5/2012 | Pakula et al. |
| 2013/0082883 A1 | 4/2013 | Montevirgen et al. |

(Continued)

FOREIGN PATENT DOCUMENTS

| | | |
|---|---|---|
| EP | 2 777 909 | 9/2014 |
| KR | 10-0824012 | 4/2008 |

(Continued)

OTHER PUBLICATIONS

International Search Report dated Feb. 15, 2017 issued in counterpart application No. PCT/KR2016/012698, 3 pages.

(Continued)

*Primary Examiner* — Jerry Wu
(74) *Attorney, Agent, or Firm* — The Farrell Law Firm, P.C.

(57) ABSTRACT

An electronic device is provided. The electronic device includes a first plate, a second plate having a flat surface and being at least partially formed of a polymer material, a housing, which encloses a space between the first plate and the second plate, is at least partially formed of a metal material, and includes a side member that is integrally formed with the second plate, wherein the side member has a first portion adjacent to a peripheral portion of the second plate, and the first portion has a first surface substantially facing in the second direction, contacts the peripheral portion of the second plate, and has a second surface facing in a third direction different from the first direction and the second direction.

7 Claims, 23 Drawing Sheets

(56) References Cited

U.S. PATENT DOCUMENTS

| | | |
|---|---|---|
| 2013/0318766 A1 | 12/2013 | Kiple et al. |
| 2014/0228080 A1 | 8/2014 | Choi et al. |
| 2014/0268525 A1 | 9/2014 | Hwang et al. |
| 2014/0285386 A1 | 9/2014 | Merz et al. |
| 2015/0212626 A1 | 7/2015 | Kim et al. |

FOREIGN PATENT DOCUMENTS

| | | |
|---|---|---|
| KR | 10-0898575 | 5/2009 |
| KR | 2014-0037927 | 3/2014 |
| KR | 10-1425589 | 8/2014 |
| KR | 1020140101240 | 8/2014 |

OTHER PUBLICATIONS

European Search Report dated Oct. 9, 2018 issued in counterpart application No. 16864522.4-1221, 14 pages.

* cited by examiner

ELECTRONIC DEVICE HAVING UNIBODY HOUSING AND METHOD OF MANUFACTURING THE SAME

PRIORITY

The present application claims priority under 35 U.S.C. § 119(a) to Korean Patent Application Serial No. 10-2015-0159534, which was filed on Nov. 13, 2015 in the Korean Intellectual Property Office, the entire disclosure of which is incorporated herein by reference.

BACKGROUND

1. Field of the Disclosure

The present disclosure relates generally to an electronic device, and more particularly, to an electronic device having a unibody housing and a method of manufacturing the same.

2. Description of the Related Art

Nowadays, mobile electronic devices such as a smart phone and a tablet personal computer (PC) are widely used.

The mobile electronic device may transmit and receive data of a phone call, a text message, and a mobile messenger to and from another electronic device through wireless communication.

In order to transmit and receive data to and from another electronic device, the mobile electronic device may use an external metal housing as an antenna.

A housing of the mobile electronic device may be formed using at least two different materials such as metal and a synthetic resin.

In order to enhance a design of a conventional electronic device, at a bonding portion (interface) of the metal and the synthetic resin constituting a housing, a post-processing may be performed. For example, at least two different materials such as the metal and the synthetic resin are applied to the housing of the electronic device. When the housing is a surface exposed to the outside, a post-processing process such as a putty coating and a buffing process for removing a bonding portion of a material of the metal and the synthetic resin can be performed. When producing the housing of the electronic device, the addition of such a process may increase costs and reduce productivity. Further, in the bonding portion, an actual metal feeling may be less.

Further, in the conventional electronic device, because a metal is used in a partial area of the housing, a degree of freedom of mounting, for example, magnetic secure transmission (MST), near field communication (NFC), wireless charge, and a global positioning system (GPS) antenna housed in the electronic device may be reduced and antenna performance may deteriorate.

SUMMARY

The present disclosure has been made to address the above problems and provides an electronic device having a unibody housing and a method of manufacturing the same.

In accordance with an aspect of the present disclosure, there is provided an electronic device including a display and configured for use in a communication network. The electronic device includes a first plate facing in a first direction, a second plate having a flat surface facing in a second direction opposite to the first direction and being at least partially formed of a polymer material, wherein a peripheral portion encloses the flat surface, a housing, which encloses a space between the first plate and the second plate, is at least partially formed of a metal material, and includes a side member that is integrally formed with the second plate, wherein the side member has a first portion adjacent to a peripheral portion of the second plate, and the first portion has a first surface substantially facing in the second direction, contacts the peripheral portion of the second plate, and has a second surface facing in a third direction different from the first direction and the second direction.

In accordance with another aspect of the present disclosure, there is provided an electronic device. The electronic device includes a housing having a housing space therein, wherein the housing comprises, a rear surface; and a side surface coupled to an outer circumferential surface of the rear surface, wherein the side surface includes a first surface coupled to an end surface of the rear surface thereby forming a straight line segment in a horizontal direction and a second surface formed in a vertical direction at an inside of the first surface to be bonded to an end surface of the rear surface.

In accordance with yet another aspect of the present disclosure, there is provided a method of manufacturing a housing of an electronic device. The method includes forming a side surface of the housing, forming a rear housing integrally with the side housing using an insert injection process, and forming an inclined surface having a slope at a portion of the side housing.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION

Figure 1:
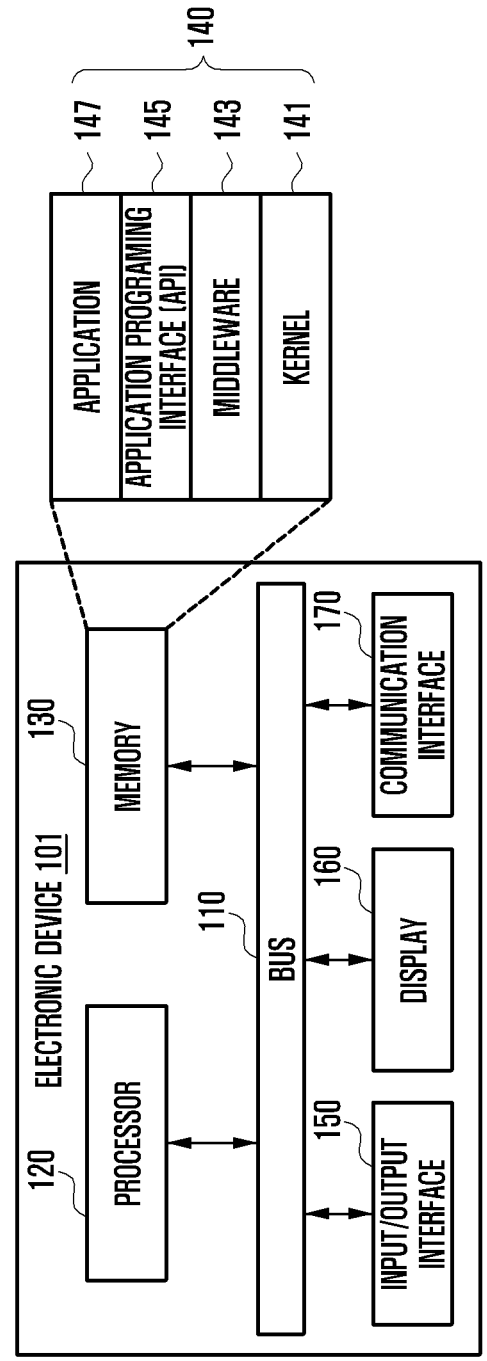
FIG. 1 is a block diagram illustrating an internal configuration of an electronic device, according to an embodiment of the present disclosure.

Embodiments of the present disclosure will be described herein below with reference to the accompanying drawings. However, the embodiments of the present disclosure are not limited to the specific embodiments and should be construed as including all modifications, changes, equivalent devices and methods, and/or alternative embodiments of the present disclosure. The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may modify various elements regardless of an order and/or importance of the corresponding elements, and do not limit the corresponding elements. These terms may be used for the purpose of distinguishing one element from another element. For example, a first user device and a second user device may indicate different user devices regardless of the order or importance. For example, a first element may be referred to as a second element without departing from the scope the present disclosure, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a CPU or an application processor) capable of performing a corresponding operation by executing one or more software programs stored in a memory device.

The term "module" as used herein may be defined as, for example, a unit including one of hardware, software, and firmware or two or more combinations thereof. The term "module" may be interchangeably used with, for example, the terms "unit", "logic", "logical block", "component", or "circuit", and the like. The "module" may be a minimum unit of an integrated component or a part thereof. The "module" may be a minimum unit performing one or more functions or a part thereof. The "module" may be mechanically or electronically implemented. For example, the "module" may include at least one of an application-specific integrated circuit (ASIC) chip, field-programmable gate arrays (FPGAs), or a programmable-logic device, which is well known or will be developed in the future, for performing certain operations.

The terms used in describing the various embodiments of the present disclosure are for the purpose of describing particular embodiments and are not intended to limit the present disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the present disclosure.

Electronic devices according to the embodiments of the present disclosure may include at least one of, for example, smart phones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to an embodiment of the present disclosure, the wearable devices may include at least one of accessory-type wearable devices (e.g., watches, rings, bracelets, anklets, necklaces, glasses, contact lenses, or head-mounted-devices (HMDs)), fabric or clothing integral wearable devices (e.g., electronic clothes), body-mounted wearable devices (e.g., skin pads or tattoos), or implantable wearable devices (e.g., implantable circuits).

The electronic devices may be smart home appliances. The smart home appliances may include at least one of, for example, televisions (TVs), digital versatile disk (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ and PlayStation™), electronic dictionaries, electronic keys, camcorders, or electronic picture frames.

The electronic devices may include at least one of various medical devices (e.g., various portable medical measurement devices (such as blood glucose meters, heart rate monitors, blood pressure monitors, or thermometers, and the like), a magnetic resonance angiography (MRA) device, a magnetic resonance imaging (MRI) device, a computed tomography (CT) device, scanners, or ultrasonic devices, and the like), navigation devices, global positioning system (GPS) receivers, event data recorders (EDRs), flight data recorders (FDRs), vehicle infotainment devices, electronic equipment for vessels (e.g., navigation systems, gyrocompasses, and the like), avionics, security devices, head units for vehicles, industrial or home robots, automatic teller machines (ATMs), points of sales (POSs) devices, or Internet of Things (IoT) devices (e.g., light bulbs, various sensors, electric or gas meters, sprinkler devices, fire alarms, thermostats, street lamps, toasters, exercise equipment, hot water tanks, heaters, boilers, and the like).

The electronic devices may further include at least one of parts of furniture or buildings/structures, electronic boards, electronic signature receiving devices, projectors, or various measuring instruments (such as water meters, electricity meters, gas meters, or wave meters, and the like). The electronic devices may be one or more combinations of the above-mentioned devices. The electronic devices may be flexible electronic devices. Also, the electronic devices are not limited to the above-mentioned devices, and may include new electronic devices according to the development of new technologies.

Hereinafter, the electronic devices according to various embodiments of the present disclosure will be described with reference to the accompanying drawings. The term "user" as used herein may refer to a person who uses an electronic device or may refer to a device (e.g., an artificial intelligence electronic device) which uses an electronic device.

FIG. 1 illustrates a network environment 100 including an electronic device 101, according to an embodiment of the present disclosure. The electronic device 101 includes a bus 110, a processor 120, a memory 130, an input/output interface 150, a display 160, and a communication interface 170. At least one of the above described components may be omitted from the electronic device 101 or another component may be further included in the electronic device 101.

The bus 110 may be a circuit connecting the above described components 120, 130, and 150-170 and transmitting communications (e.g., control messages and/or data) between the above described components.

The processor 120 may include one or more of the following: a central processing unit (CPU), an application processor (AP), and a communication processor (CP). The processor 120 is capable of controlling at least one of other components of the electronic device 101 and/or processing data or operations related to communication.

The memory 130 may include volatile memory and/or non-volatile memory. The memory 130 is capable of storing data or commands related to at least one of other components of the electronic device 101. The memory 130 is capable of storing software and/or a program module 140. For example, the program module 140 may include a kernel 141, middleware 143, application programming interface (API) 145, application programs (or applications) 147, etc. The kernel 141, middleware 143 or at least part of the API 145 may be called an operating system (OS).

The kernel 141 is capable of controlling or managing system resources (e.g., the bus 110, processor 120, memory 130, etc.) used to execute operations or functions of other programs (e.g., the middleware 143, API 145, and application programs 147). The kernel 141 provides an interface capable of allowing the middleware 143, API 145, and application programs 147 to access and control/manage the individual components of the electronic device 101.

The middleware 143 may be an interface between the API 145 or application programs 147 and the kernel 141 so that the API 145 or the application programs 147 can communicate with the kernel 141 and exchange data therewith. The middleware 143 is capable of processing one or more task requests received from the application programs 147 according to the priority. For example, the middleware 143 is capable of assigning a priority for use of system resources of the electronic device 101 (e.g., the bus 110, processor 120, memory 130, etc.) to at least one of the application programs 147. For example, the middleware 143 processes one or more task requests according to a priority assigned to at least one application program, thereby performing scheduling or load balancing for the task requests.

The API 145 may be an interface that is configured to allow the application programs 147 to control functions provided by the kernel 141 or the middleware 143. The API 145 may include at least one interface or function (e.g., instructions) for file control, window control, image process, text control, or the like.

The input/output interface 150 is capable of transferring instructions or data, received from the user or external devices, to one or more components of the electronic device 101. The input/output interface 150 is capable of outputting instructions or data, received from one or more components of the electronic device 101, to the user or external devices.

The display 160 may include a liquid crystal display (LCD), a flexible display, a transparent display, a light emitting diode (LED) display, an organic LED. (OLED) display, micro-Electro-mechanical systems (MEMS) display, an electronic paper display, etc. The display 160 is capable of displaying various types of content (e.g., texts, images, videos, icons, symbols, etc.). The display 160 may also be implemented with a touch screen. In this case, the display 160 is capable of receiving touches, gestures, proximity inputs or hovering inputs, via a stylus pen, or a user's body.

The communication interface 170 is capable of establishing communication between the electronic device 101 and an external device For example, the communication interface 170 is capable of communicating with an external device connected to the network 162 via wired or wireless communication.

Wireless communication may employ, as cellular communication protocol, at least one of long-term evolution (LTE), LTE Advance (LTE-A), code division multiple access (CDMA), wideband CDMA (WCDMA), universal mobile telecommunications system (UMTS), wireless broadband (WiBro), and global system for mobile communication (GSM). Wireless communication may also include short-wireless communication 164. Short-wireless communication 164 may include at least one of wireless fidelity (WiFi), bluetooth (BT), near field communication (NFC), magnetic secure transmission (MST), and global navigation satellite system (GNSS). The GNSS may include at least one of global positioning system (GPS), global navigation satellite system (Glonass), Beidou NSS (Beidou), Galileo, the European global satellite-based navigation system, according to GNSS using areas, bandwidths, etc. In the present disclosure, "GPS" and "GNSS" may be used interchangeably. Wired communication may include at least one of universal serial bus (USB), high definition multimedia interface (HDMI), recommended standard 232 (RS-232), and plain old telephone service (POTS). The network 162 may include at least one of the following: a telecommunications network, e.g., a computer network (e.g., LAN or WAN), the Internet, and a telephone network.

Figure 2:
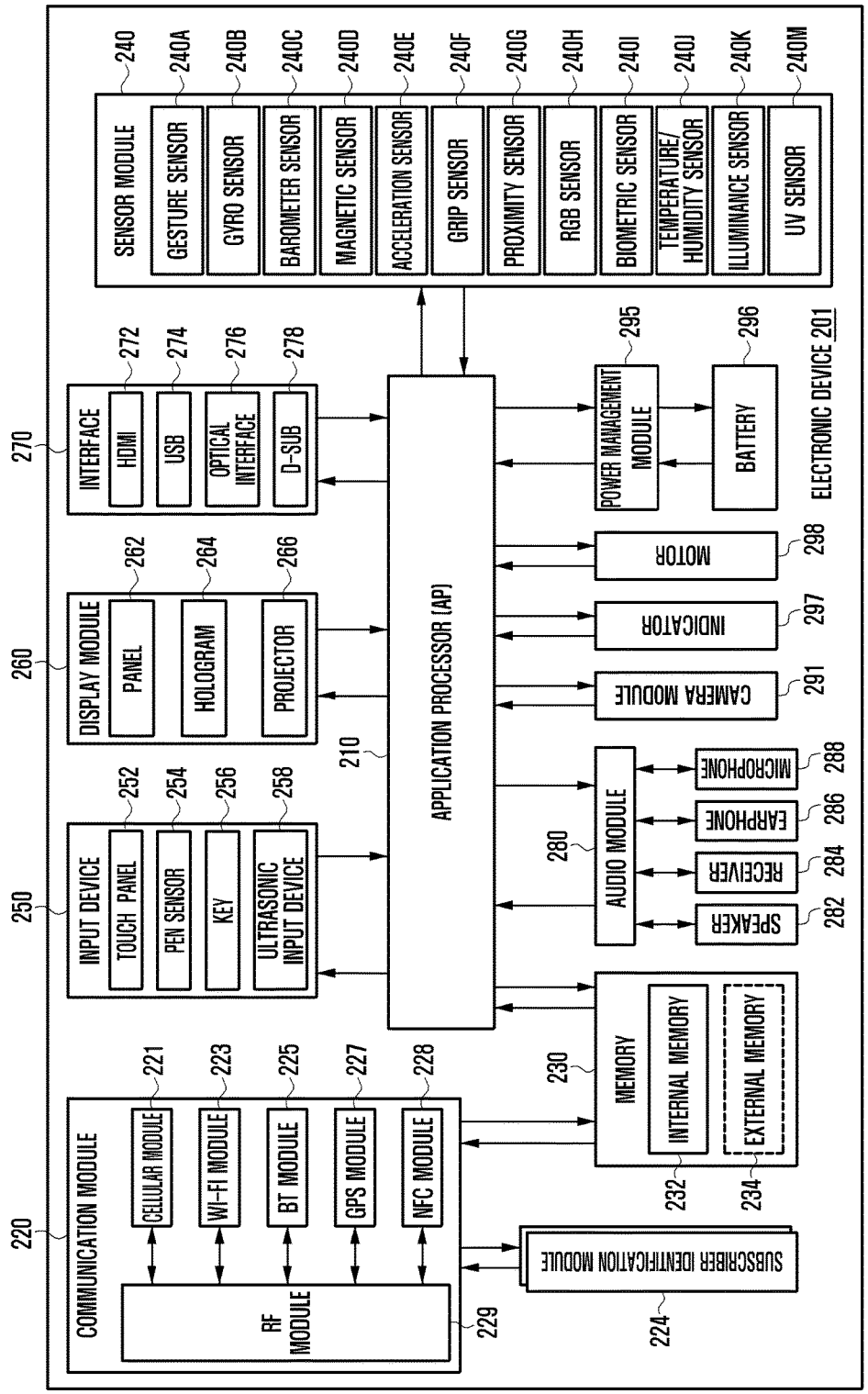
FIG. 2 is a block diagram illustrating a detailed configuration of an electronic device, according to an embodiment of the present disclosure.

FIG. 2 is a block diagram showing a configuration of an electronic device 201, according to an embodiment of the present disclosure. For example, the electronic device 201 may include part or all of the components in the electronic device 101 shown in FIG. 1. The electronic device 201 may include one or more processors 210 (e.g., application processors (APs)), a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 is capable of driving, for example, an operating system or an application program to control a plurality of hardware or software components connected to the processor 210, processing various data, and performing operations. The processor 210 may be implemented as, for example, a system on chip (SoC). The processor 210 may further include a graphic processing unit (GPU) and/or an image signal processor. The processor 210 may also include at least part of the components shown in FIG. 2, e.g., a cellular module 221. The processor 210 is capable of loading commands or data received from at least one of other components (e.g., a non-volatile memory) on a volatile memory, processing the loaded commands or data. The processor 210 is capable of storing various data in a non-volatile memory.

The cellular module 221 is capable of providing a voice call, a video call, an SMS service, an Internet service, etc., through a communication network, for example. The cellular module 221 is capable of identifying and authenticating an electronic device 201 in a communication network by using the SIM 224. The cellular module 221 is capable of performing at least part of the functions provided by the processor 210. The cellular module 1721 may include a communication processor (CP).

Each of the WiFi module 223, the BT module 225, the GNSS module 227, and the NFC module 228 may include a processor for processing data transmitted or received through the corresponding module. At least part of the cellular module 221, WiFi module 223, BT module 225, GNSS module 227, and NFC module 228 (e.g., two or more modules) may be included in one integrated chip (IC) or one IC package.

The RF module 229 is capable of transmission/reception of communication signals, e.g., RF signals. The RF module 229 is capable of including a transceiver, a power amp module (PAM), a frequency filter, a low noise amplifier (LNA), an antenna, etc. At least one of cellular module 221, WiFi module 223, BT module 225, GNSS module 227, and NFC module 228 is capable of transmission/reception of RF signals through a separate RF module.

The SIM module 224 may be an embodied SIM. The SIM module 224 may include unique identification information, e.g., integrated circuit card identifier (ICCID), or subscriber information, e.g., international mobile subscriber identity (IMSI).

The memory 230 may include a built-in memory 232 or an external memory 234. The built-in memory 232 is capable of including at least one of a volatile memory, e.g., a dynamic random access memory (DRAM), a static RAM (SRAM), a synchronous dynamic RAM (SDRAM), etc.; and a non-volatile memory, e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, an NOR flash memory, etc.), a hard drive, a solid state drive (SSD), etc.

The external memory 234 may include a flash drive, e.g., a compact flash (CF), a secure digital (SD), a micro secure digital (Micro-SD), a mini secure digital (Mini-SD), an extreme digital (xD), a multi-media card (MMC), a memory stick, etc. The external memory 234 may be connected to the electronic device 201, functionally and/or physically, through various interfaces.

The sensor module 240 is capable of measuring/detecting a physical quantity or an operation state of the electronic device 201, and converting the measured or detected information into an electronic signal. The sensor module 240 may include at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red, green and blue (RGB) sensor), a biometric sensor 240I, a temperature/humidity sensor 240J, an illuminance sensor 240K, and a ultraviolet (UV) sensor 240M. Additionally or alternatively, the sensor module 240 may also include an e-nose sensor, an electromyography (EMG) sensor, an electroencephalogram (EEG) sensor, an electrocardiogram (ECG) sensor, an infrared (IR) sensor, an iris sensor and/or a fingerprint sensor. The sensor module 240 may further include a control circuit for controlling one or more sensors included therein. The electronic device 201 may include a processor, configured as part of the processor 210 or a separate component, for controlling the sensor module 240. In this case, while the processor 210 is operating in sleep mode, the processor is capable of controlling the sensor module 240.

The input device 250 may include a touch panel 252, a (digital) pen sensor 254, a key 256, or an ultrasonic input unit 258. The touch panel 252 may be implemented with at least one of the following: a capacitive touch system, a resistive touch system, an infrared touch system, and an ultrasonic touch system. The touch panel 252 may further include a control circuit, and the touch panel 252 may include a tactile layer to provide a tactile response to the user. The (digital) pen sensor 254 may be implemented with a part of the touch panel or with a separate recognition sheet. The key 256 may include a physical button, an optical key, or a keypad. The ultrasonic input unit 258 is capable of detecting ultrasonic waves, created in an input tool, through a microphone 288, and identifying data corresponding to the detected ultrasonic waves.

The display 260 may include a panel 262, a hologram unit 264, or a projector 266. The panel 262 may include the same or similar components as the display 160 shown in FIG. 1. The panel 262 may be implemented to be flexible, transparent, or wearable. The panel 262 may also be incorporated into one module together with the touch panel 252. The hologram unit 264 is capable of showing a stereoscopic image in the air by using light interference. The projector 266 is capable of displaying an image by projecting light onto a screen. The screen may be located inside or outside of the electronic device 201. The display 260 may further include a control circuit for controlling the panel 262, the hologram unit 264, or the projector 266.

The interface 270 may include an HDMI 272, a USB 274, an optical interface 276, or a d-subminiature (D-sub) 278. The interface 270 may be included in the communication interface 170 shown in FIG. 1. Additionally or alternatively, the interface 270 may include a mobile high-definition link (MHL) interface, a SD card/multimedia card (MMC) interface, or an infrared data association (IrDA) standard interface.

The audio module 280 is capable of providing bidirectional conversion between a sound and an electronic signal. At least part of the components in the audio module 280 may be included in the input/output interface 150 shown in FIG. 1. The audio module 280 is capable of processing sound information input or output through a speaker 282, a receiver 284, earphones 286, microphone 288, etc.

The camera module 291 is a device capable of taking both still and moving images. The camera module 291 may include one or more image sensors (e.g., a front image sensor or a rear image sensor), a lens, an image signal processor (ISP), a flash (e.g., an LED or xenon lamp), etc.

The power management module 295 is capable of managing power of the electronic device 201. The power management module 295 may include a power management integrated circuit (PMIC), a charger IC, or a battery gauge. The PMIC may employ wired charging and/or wireless charging methods. Examples of the wireless charging method are magnetic resonance charging, magnetic induction charging, and electromagnetic charging. To this end, the PIMC may further include an additional circuit for wireless charging, such as a coil loop, a resonance circuit, a rectifier, etc. The battery gauge is capable of measuring the residual capacity, charge in voltage, current, or temperature of the battery 296. The battery 296 takes the form of either a rechargeable battery or a solar battery.

The indicator 297 is capable of displaying a specific status of the electronic device 201 or a part thereof (e.g., the processor 210), e.g., a boot-up status, a message status, a charging status, etc. The motor 298 is capable of converting an electrical signal into mechanical vibrations, such as, a vibration effect, a haptic effect, etc. The electronic device 201 may also include a processing unit (e.g., GPU) for supporting a mobile TV. The processing unit for supporting a mobile TV is capable of processing media data pursuant to standards, e.g., digital multimedia broadcasting (DMB), digital video broadcasting (DVB), or mediaFlo™, etc.

Figure 3A:
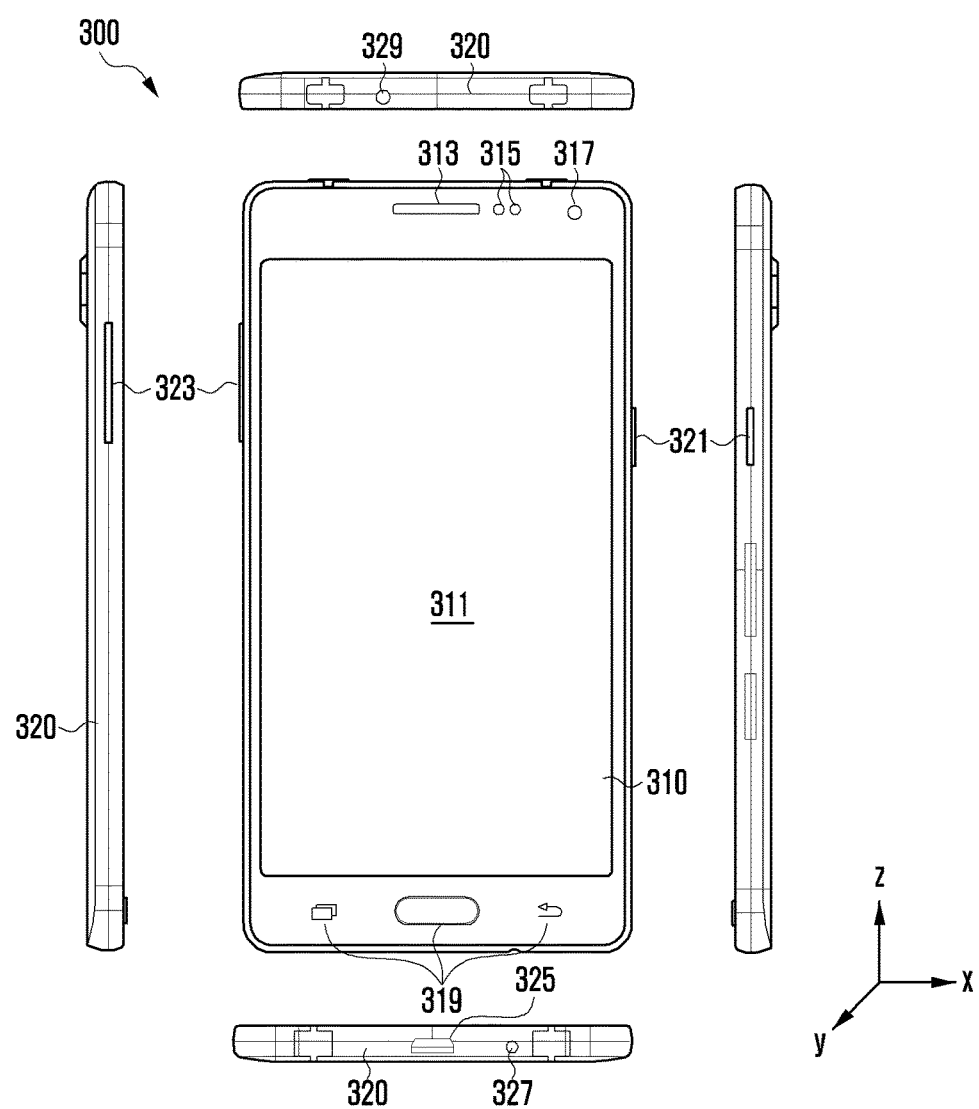
FIGS. 3A and 3B are diagrams illustrating an external configuration of an electronic device, according to an embodiment of the present disclosure.
Figure 3B:
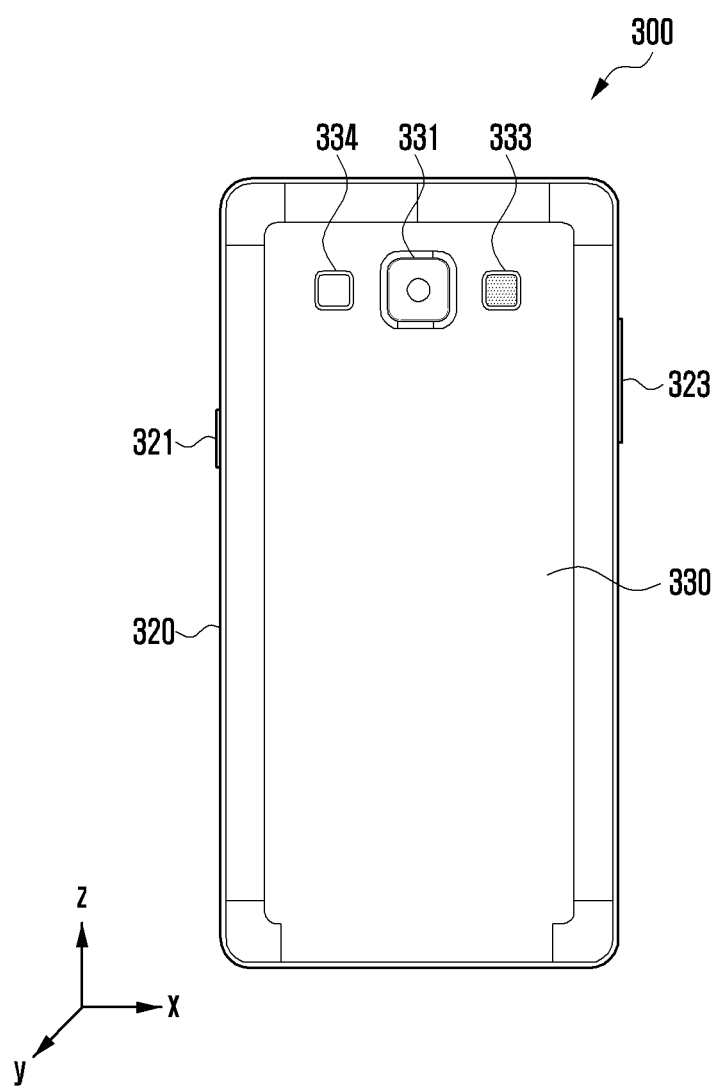

FIGS. 3A and 3B are diagrams illustrating an external configuration of an electronic device, according to an embodiment of the present disclosure. Specifically, FIG. 3A is a diagram illustrating a configuration of a front surface and a side surface of an electronic device, according to an embodiment of the present disclosure, and FIG. 3B is a diagram illustrating a configuration of a rear surface of an electronic device, according to an embodiment of the present disclosure. An electronic device 300 of FIG. 3 may include all or some of the components of the electronic devices 101 and 201 of FIGS. 1 and 2, respectively.

Referring to FIGS. 3A and 3B, the electronic device 300 includes a front surface 310, side surface 320, and rear surface 330.

A window 311, a receiver hole 313, a sensor hole 315, a front camera hole 317, and a plurality of key buttons 319 may be disposed at the front surface 310 of the electronic device 300.

The window 311 may perform an image display function and an input function in response to a user touch. To this end, the window 311 may be a touch window including a touch panel and a display.

The receiver hole 313 may convert an electric signal output from an audio device mounted within the electronic device 300 to a sound and may output the sound. The receiver hole 313 may be disposed at the side surface 320 and the rear surface 330 of the electronic device 300 and may be disposed to correspond to, for example, a receiver and a speaker.

At least one sensor hole 315 may be provided at a predetermined location within the electronic device 300, may measure a physical quantity or may detect an operation state of the electronic device 300, and may be disposed to correspond to a sensor that converts measured or detected information to an electric signal. The sensor may include at least one of the aforementioned sensors described with reference to FIG. 2 (e.g., a gesture sensor 240A, a proximity sensor 240G, a grip sensor 240F, a gyro sensor 240B, an acceleration sensor 240E, a terrestrial magnetic sensor, an atmospheric pressure sensor (barometer sensor 240C), a temperature/humidity sensor 240J, a hole sensor, an RGB sensor 240H, an illumination sensor 240K, a biometric sensor 240I, and a UV sensor 240M) or other suitable sensor.

The front camera hole 317 may be disposed to correspond to a camera that photographs an image and a moving picture of the front side of the electronic device 300.

The plurality of key buttons 319 may be embodied in a press key button or a touch key and may include a menu key, home key, and cancel key.

A power on/off button 321, volume adjustment button 323, port 325, microphone 327, and jack 329 may be disposed at the side surface 320 of the electronic device 300.

The power on/off button 321 may turn on or off power of the electronic device 300.

The volume adjustment button 323 may adjust a volume of a sound output from the electronic device 300.

The port 325 may be an interface device for electric connection to another electronic device. The port 325 may be connected to at least one of an ear jack, a charge jack, and a communication jack. The port 325 may connect a plug of an HDMI, a USB, projector, and a D-sub cable.

The microphone 327 may convert an external sound to an electric signal and input the electric signal to the electronic device 300.

The jack 329 may electrically connect a plug of an earphone, ear set, and headset.

A rear camera 331, speaker emission hole 333, and flash window 334 may be disposed at the rear surface 330 of the electronic device 300.

The rear camera 331 may photograph an image and a moving picture of the rear side of the electronic device 300 and include at least one image sensor and an ISP.

The speaker emission hole 333 may be disposed to correspond to a speaker that outputs a sound output from a speaker mounted within the electronic device.

The flash window 334 may be disposed at one side of the rear camera 331, emit light, and obtain an additional light quantity according to a setting when photographing an image and a moving picture.

The front surface 310 and the rear surface 330 of the electronic device 300 may be opposite to each other, and the side surface 320 may enclose space between the front surface 310 and the rear surface 330. The side surface 320 and the rear surface 330 may be integrally formed and may form a housing having a front side that is opened. The side surface 320 may be made of metal (e.g., aluminum (AL) or AL alloy, or the like), and the rear surface 330 may be made of a polymer material (e.g., polycarbonate (PC) or the like). The rear surface 330 may have a first plate facing in a first direction and a second plate having a flat surface facing in a second direction, which is opposite to the first direction. The second plate having the flat surface may include a peripheral portion at an end portion thereof. The side surface 320 may enclose a space between the first plate and the second plate.

With respect to the electronic device 300, the processor 120, the memory 130, the display 160, and the communication interface 170 of FIG. 1 may be disposed in a housing space, which is formed through the side surface 320 and the rear surface 330, within a housing of the electronic device 300. Further, the processor 210, communication module 220, memory 230, sensor module 240, display 260, and interface 270 of FIG. 2 may be disposed in the housing space within the housing of the electronic device 300. Other components of FIGS. 1 and 2 may also be disposed in the housing space within the housing.

The processor 120, which may be formed with a single core processor or a multi-core processor, may control general operations of the electronic device 300 and a signal flow between internal devices and perform a data processing function that processes data.

With respect to the electronic device 300, the memory 130 may store application programs necessary for other option functions, for example audio reproduction function, image or moving picture reproduction function, broadcasting reproduction function, Internet access function, text message function, game player function, and navigation service function as well as an OS of the electronic device 300.

With respect to the electronic device 300, the display 160 may display information input by a user or information for providing to a user as well as various menus of the electronic device 300.

With respect to the electronic device 300, the communication interface 170 may include a mobile communication module that supports a mobile communication of $2^{nd}$ Generation (G), 3G, 4G, and/or 5G specification function, a wireless LAN communication module that supports a short range wireless communication function, and a communication circuit that supports a wireless communication function of a Wi-Fi communication module, BT communication module, infrared ray communication module, and Zigbee communication module.

With respect to the electronic device 300, the communication interface 170 may include an HDMI communication module and a USB communication module that supports a wire communication function.

Figure 4:
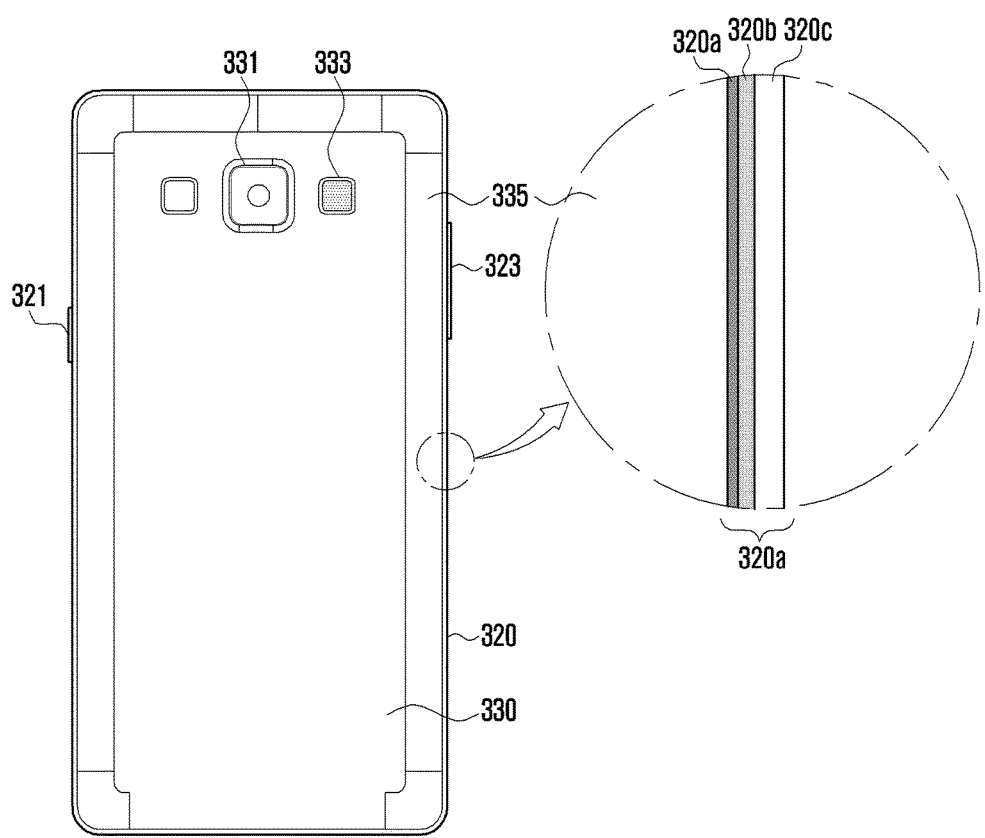
FIG. 4 is a diagram illustrating a bonding structure of a side surface (shown in the enlarged area of detail) and a rear surface of an electronic device housing, according to an embodiment of the present disclosure.

FIG. 4 is a diagram illustrating a bonding structure of the side surface 320 and the rear surface 330 of the electronic device housing, according to an embodiment of the present disclosure.

With reference to FIG. 4, the rear surface 330 may include an edge portion 335 (which is shown in the enlarged area of detail of FIG. 4) in which a periphery of the center thereof is formed in a flat surface and in which an outer edge thereof is rounded downward. A periphery of the center of the rear surface 330 is formed in a flat surface, but it may be formed in a non-flat surface including a curved surface. An end surface of the edge portion 335 of the rear surface 330 may be disposed adjacent to the side surface 320 side. The side surface 320 may include a first surface 320a (in which an end surface of the edge portion 335 of the rear surface 330 and one end surface thereof are bonded), an inclined surface 320b (integrally extended from the first surface 320a to be cut by an external processing), and an external appearance surface 320c (integrally connected to the inclined surface 320b to form a side surface of the housing). The first surface 320a may be adjacent to a straight line in a horizontal direction and may have a width of approximately 0.1 mm-0.4 mm. The first surface 320a may form an angle of approximately 0°-10° from the window 311. During a manufacturing process of the electronic device 300, when an insert target is injected, an insert injection mold that prevents PC from overflowing to a metal portion and a straight line portion of an insert target (e.g., basic metal material) should attach upon closing a mold and both should be attached, but a contact force may weaken when the angle increases. Therefore, it is preferred that the angle is 0°, and it is preferable that the angle is approximately 10° or less in consideration of an angle that may be deformed by an injection pressure upon injecting or when an insert target is pressed by a mold. When forming the inclined surface 320b by the external processing, in order to prevent damage of the rear surface 330 made of PC, the first surface 320a may be formed with a spare area for an external processing such as diamond cutting and may have a width of approximately 0 mm-0.1 mm after cutting by the external processing.

Figure 5:
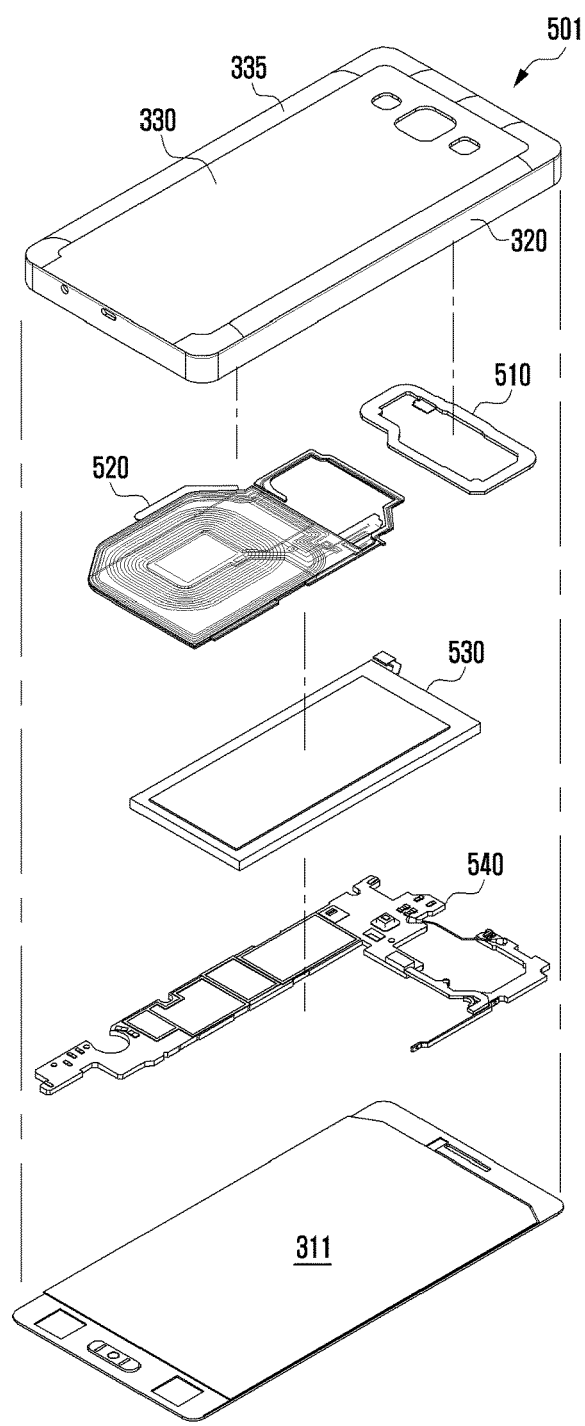
FIGS. 5 and 6 are exploded, perspective views illustrating an internal configuration of an electronic device, according to an embodiment of the present disclosure.
Figure 6:
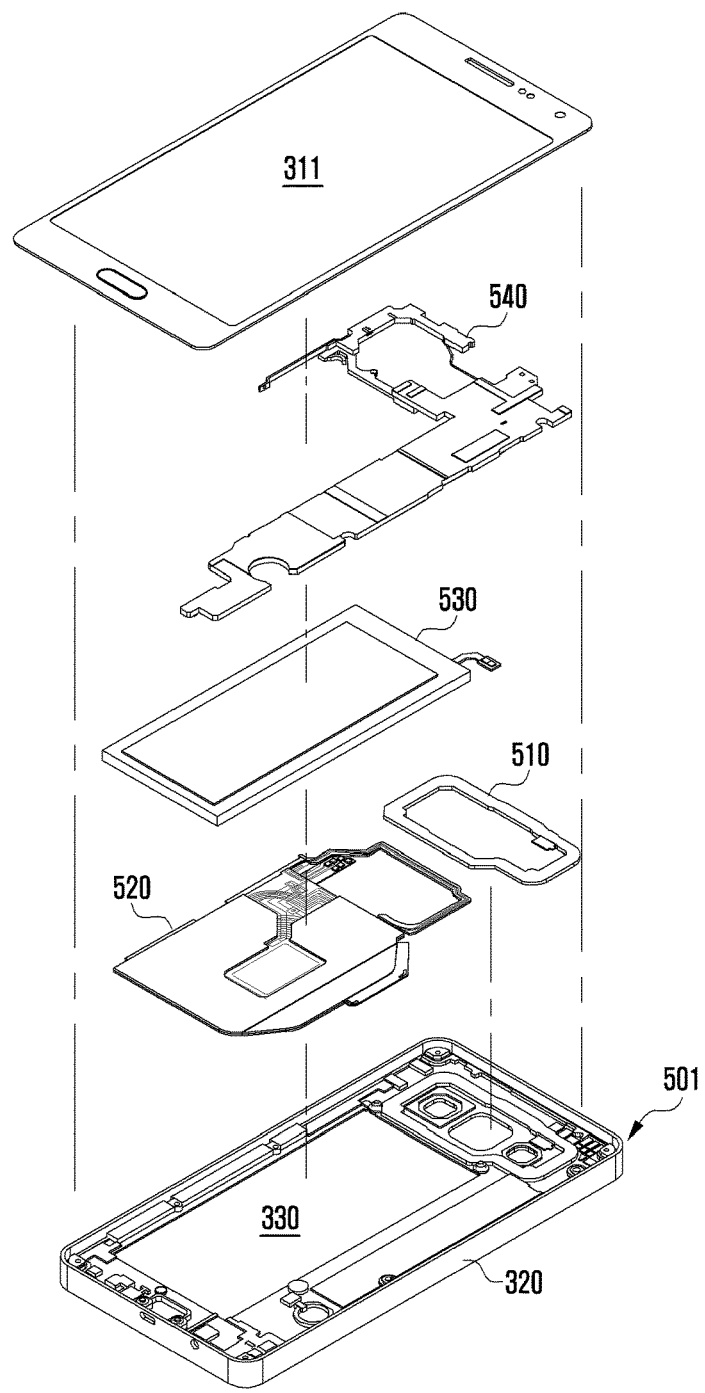
Figure 7:
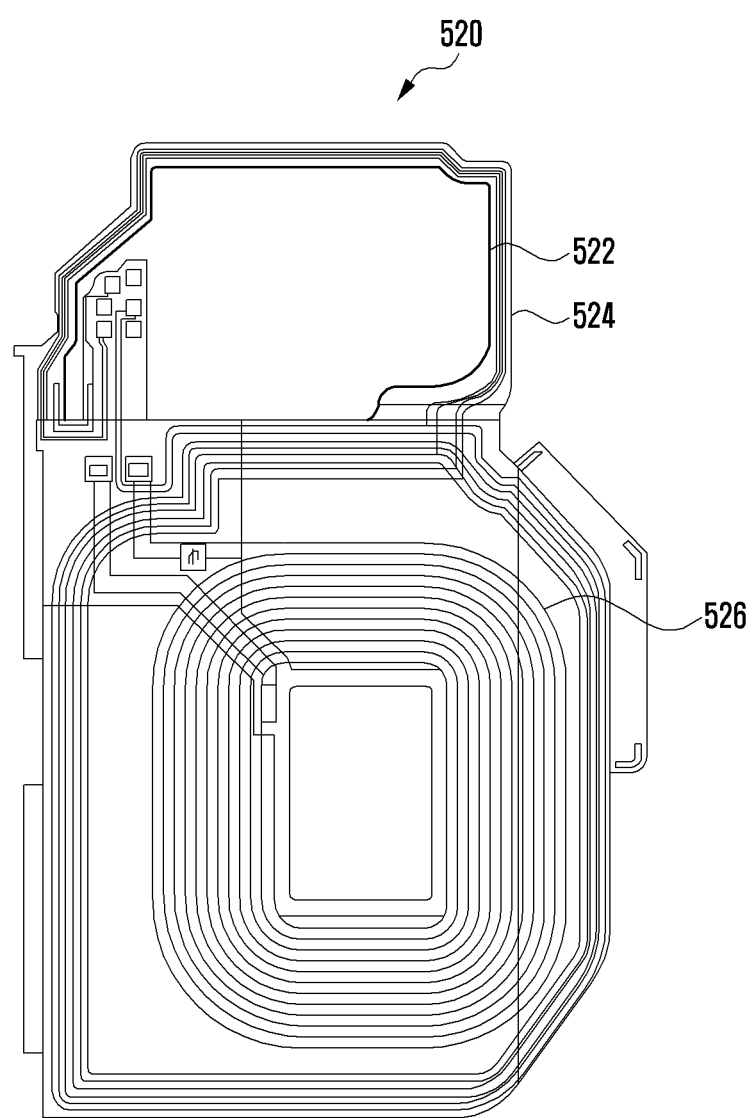
FIG. 7 is a diagram illustrating a detailed configuration of an antenna module of FIGS. 5 and 6, according to an embodiment of the present disclosure.

FIGS. 5 and 6 are exploded, perspective views illustrating an internal configuration of the electronic device 300, according to an embodiment of the present disclosure. FIG. 7 is a diagram illustrating a detailed configuration of an antenna module of FIGS. 5 and 6, according to an embodiment of the present disclosure.

With reference to FIGS. 5 and 6, the electronic device 300 may include a housing 501, GPS antenna 510, antenna module 520, battery 530, printed board assembly (PBA) 540, and window 311.

In the housing 501, the side surface 320 and the rear surface 330 are integrally formed, and the housing 501 may have a housing space that can have various components disposed therein. At least a portion of a flat surface of the rear surface 330 of the housing 501 may include at least one opening portion.

The GPS antenna 510 may be disposed at an upper portion of the rear surface 330, and the antenna module 520 may be disposed at a periphery of the center of the rear surface 330. The GPS antenna 510 and the antenna module 520 are not limited at a specific location within the housing 501 and may be disposed at various locations, as needed.

The antenna module 520 may include an MST antenna 522, an NFC antenna 524, and wireless charge antenna 526, as shown in FIG. 7.

The MST antenna 522 may be formed by winding a coil approximately 8-10 times. An inductance value of the MST antenna 522 may be, for example 10-20 uH. The NFC antenna 524 is disposed at the outside of the MST antenna 522, and an inductance value thereof may be, for example, less than 1 uH. The wireless charge antenna 526 may be formed at a portion of the inside of the MST antenna 522, and an inductance value thereof may be, for example 5-10 uH. The MST antenna 522 and the wireless charge antenna 526 may have many winding numbers compared with the coil winding number of the NFC antenna 524.

The battery 530 is disposed at an upper portion of the antenna module 520 to supply power necessary for driving the electronic device 300.

The PBA 540 may include a printed circuit board (PCB) that mounts the processor 120, the memory 130, and the communication interface 170 of FIG. 1.

The window 311 includes the displays 160 and 260 of FIGS. 1 and 2 and may be disposed at one surface of the housing 501. The window 311 may be disposed at a side surface of the electronic device 300 such that a user can touch the window 311.

Figure 8:
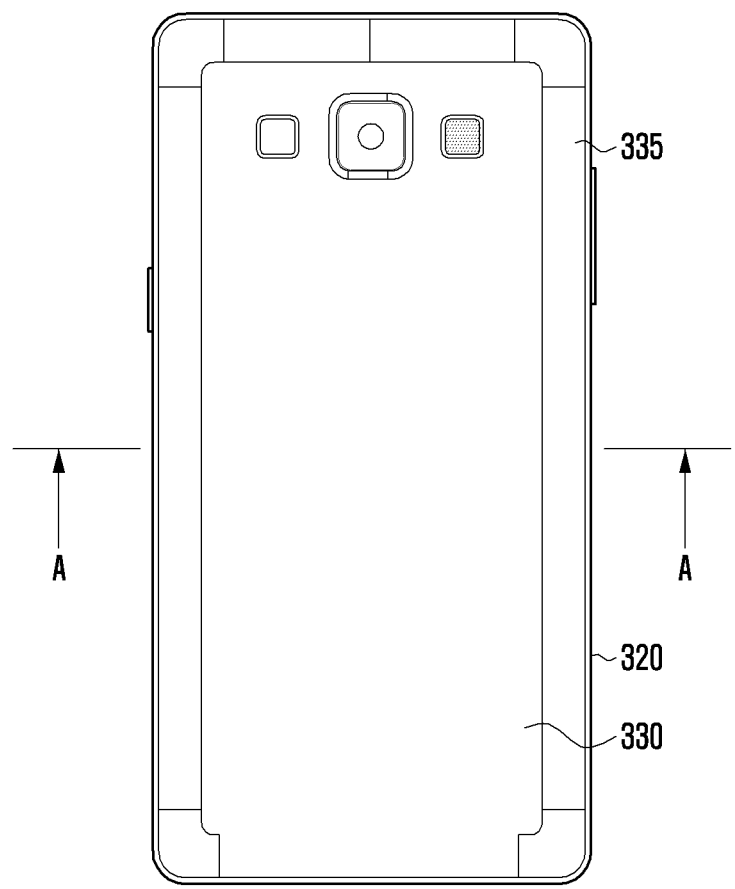
FIG. 8 is a diagram illustrating a coupling state of a side surface and a rear surface of an electronic device, according to an embodiment of the present disclosure.
Figure 9:
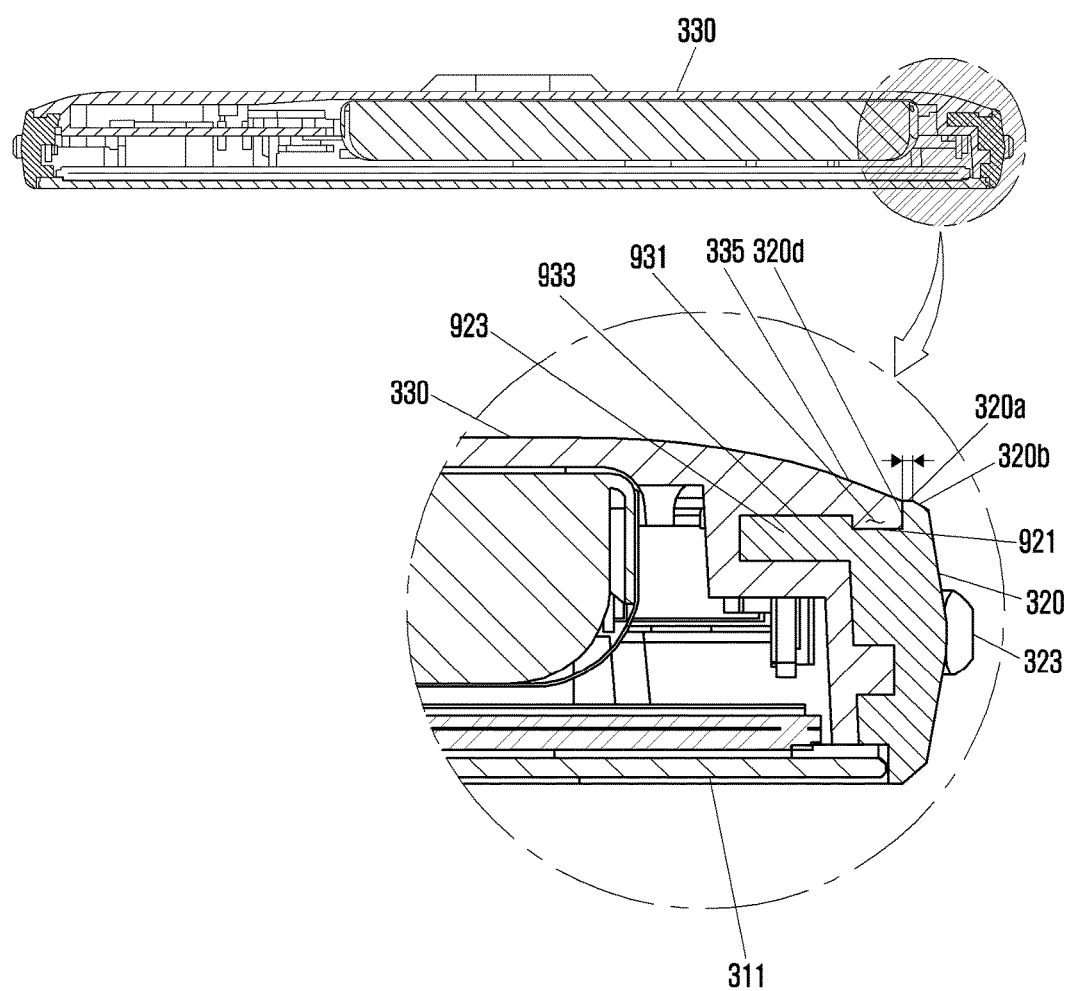
FIG. 9 is a cross-sectional view and a partially enlarged view illustrating a portion A-A of FIG. 8, according to an embodiment of the present disclosure.

FIG. 8 is a diagram illustrating a coupling state of the side surface 320 and the rear surface 330 of the electronic device 300, according to an embodiment of the present disclosure, and FIG. 9 is a cross-sectional view and a partially enlarged view illustrating a portion A-A of FIG. 8.

With reference to FIGS. 8 and 9, the side surface 320 may include a first portion adjacent to an end surface of the edge portion 335 of the rear surface 330. The end surface of the edge portion 335 of the rear surface 330 may be disposed adjacent to the side surface 320 side. The side surface 320 may include a first surface 320*a* having one end bonded to an end surface of the edge portion 335 of the rear surface 330 and having a straight line segment in a horizontal direction and an inclined surface 320*b* integrally extended from the first surface 320*a* and cut by an external processing. The first surface 320*a* is similar to approximately a straight line in substantially a horizontal direction and may have a width of approximately 0.1 mm-0.4 mm. The first surface 320*a* may form an angle of approximately 0°-10° from the window 311. When the first surface 320*a* forms the inclined surface 320*b* by an external processing, in order to prevent damage of the rear surface 330 made of PC, the first surface 320*a* may be formed with a spare area for an external processing such as diamond cutting, and, after cutting by the external processing, the first surface 320*a* may have a width of approximately 0 mm-0.1 mm. The side surface 320 may include a second surface 320*d* which is substantially perpendicular to the first surface 320*a* and bonded to an end surface of the edge portion 335 of the rear surface 330.

A convex portion 931 is formed at a periphery of an end surface of the edge portion 335 of the rear surface 330, and a recess portion 921 may be formed, at the side surface 320 of a periphery bonded to an end surface of the edge portion 335 of the rear surface 330. A groove portion 933 is formed at the inside of a convex portion 931 formed at a periphery of an end surface of the edge portion 335 of the rear surface 330, and a protrusion portion 923 may be formed to correspond to the groove portion 933 at the inside of the recess portion 921 formed at the side surface 320. The convex portion 931 formed at a periphery of an end surface of the edge portion 335 may be coupled at the recess portion 921 formed at the side surface 320. The protrusion portion 923 formed at the side surface 320 may be coupled at the groove portion 933 formed at the edge portion 335. That is, by alternately coupling a bonding portion in which an end surface of the edge portion 335 of the rear surface 330 and the inside of the side surface 320 meet to the recess portion 921, the convex portion 931, and the protrusion portion 923 through the groove portion 933, the side surface 320 and the rear surface 330 are not easily separated. The side surface 320, which can be made of metal, may form a stable structure that supports the rear surface 330, which can be made of a polymer material.

The recess portion 921 and the protrusion portion 923 may be formed at the inside of the side surface 320, and the convex portion 931 and the groove portion 933 may be formed at a periphery of the edge portion 335 of the rear surface 330. On the other hand, the convex portion 931 and the groove portion 933 may be formed at the inside of the side surface 320, and a recess portion and a protrusion portion may be formed at the edge portion 335 of the rear surface 330.

Figure 10:
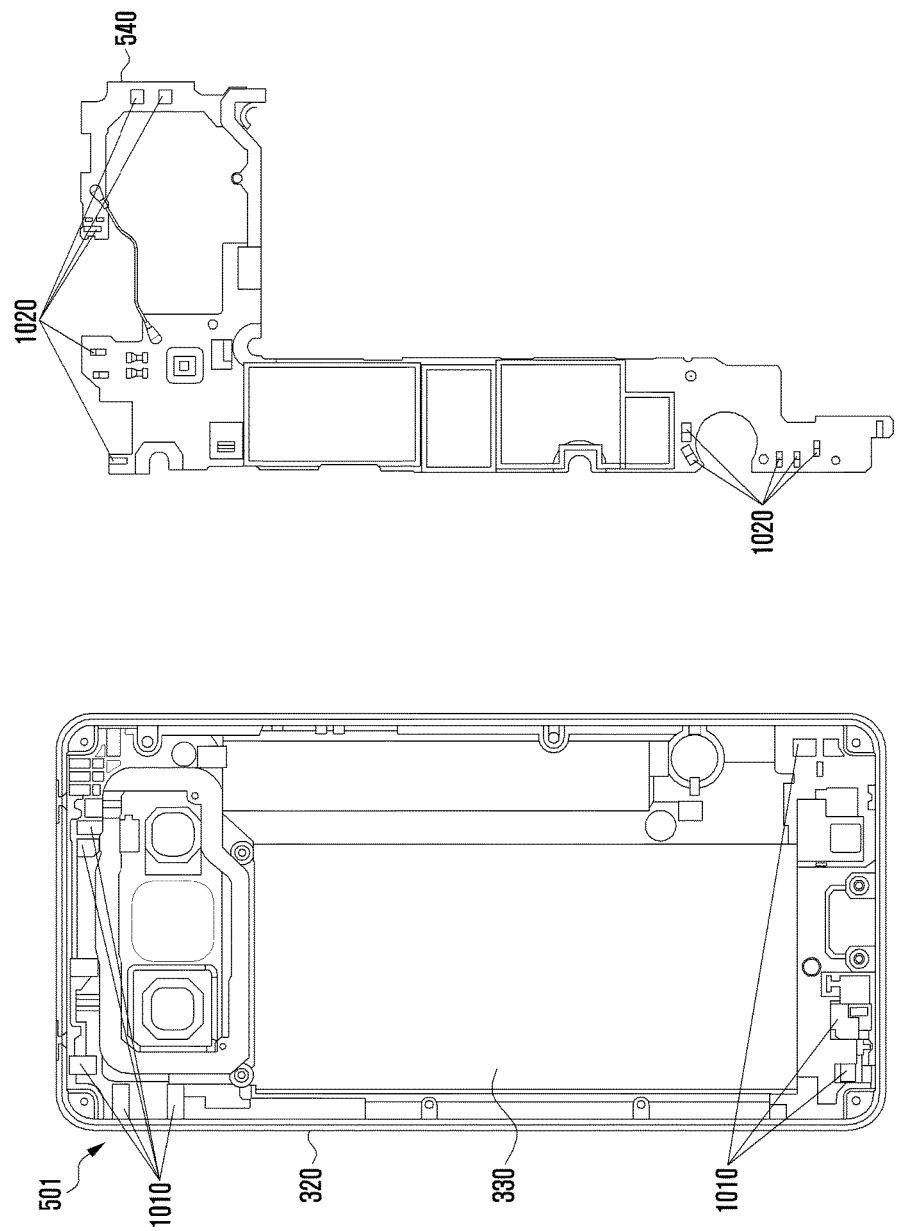
FIG. 10 is a diagram illustrating a ground portion and a terminal of a printed board assembly (PBA) of an electronic device housing, according to an embodiment of the present disclosure.

FIG. 10 is a diagram illustrating a ground portion of the housing 501 and a ground terminal of a PBA, according to an embodiment of the present disclosure.

With reference to FIG. 10, a pattern for receiving various components such as the GPS antenna 510, the antenna module 520, the battery 530, and the PBA 540 may be formed at the inside of the rear surface 330 of the housing 501.

At least one antenna ground portion 1010 may be formed at each of an upper portion and a lower portion of the inside of the rear surface 330 of the housing 501. At least one ground terminal 1020 electrically connected to the antenna ground portion 1010 may be formed at each of an upper portion and a lower portion of a rear surface of the PBA 540.

Figure 11:
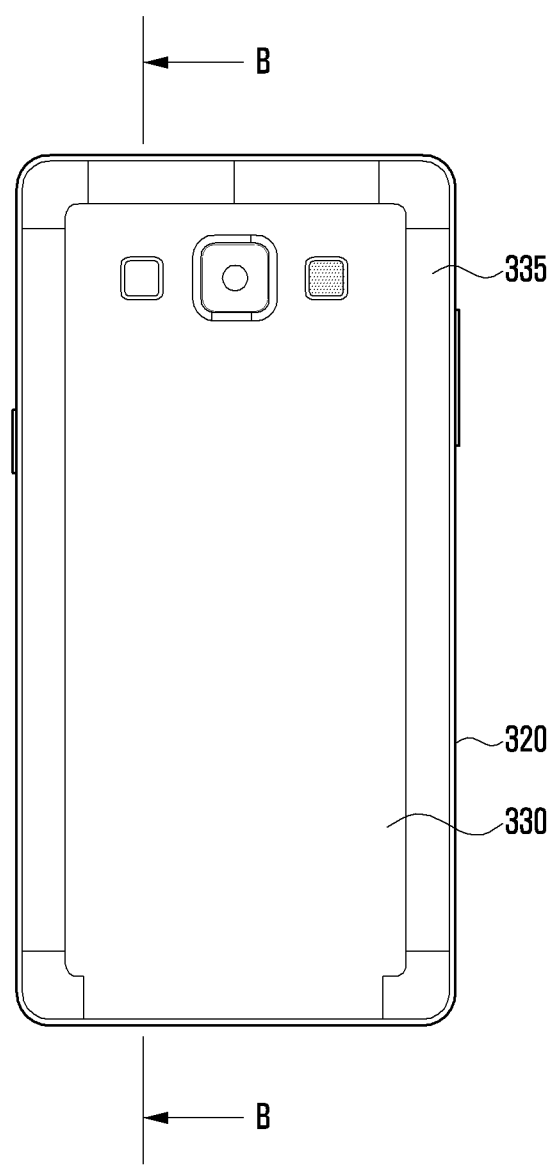
FIG. 11 is a diagram illustrating a coupling state of a side surface and a rear surface of an electronic device, according to an embodiment of the present disclosure.
Figure 12:
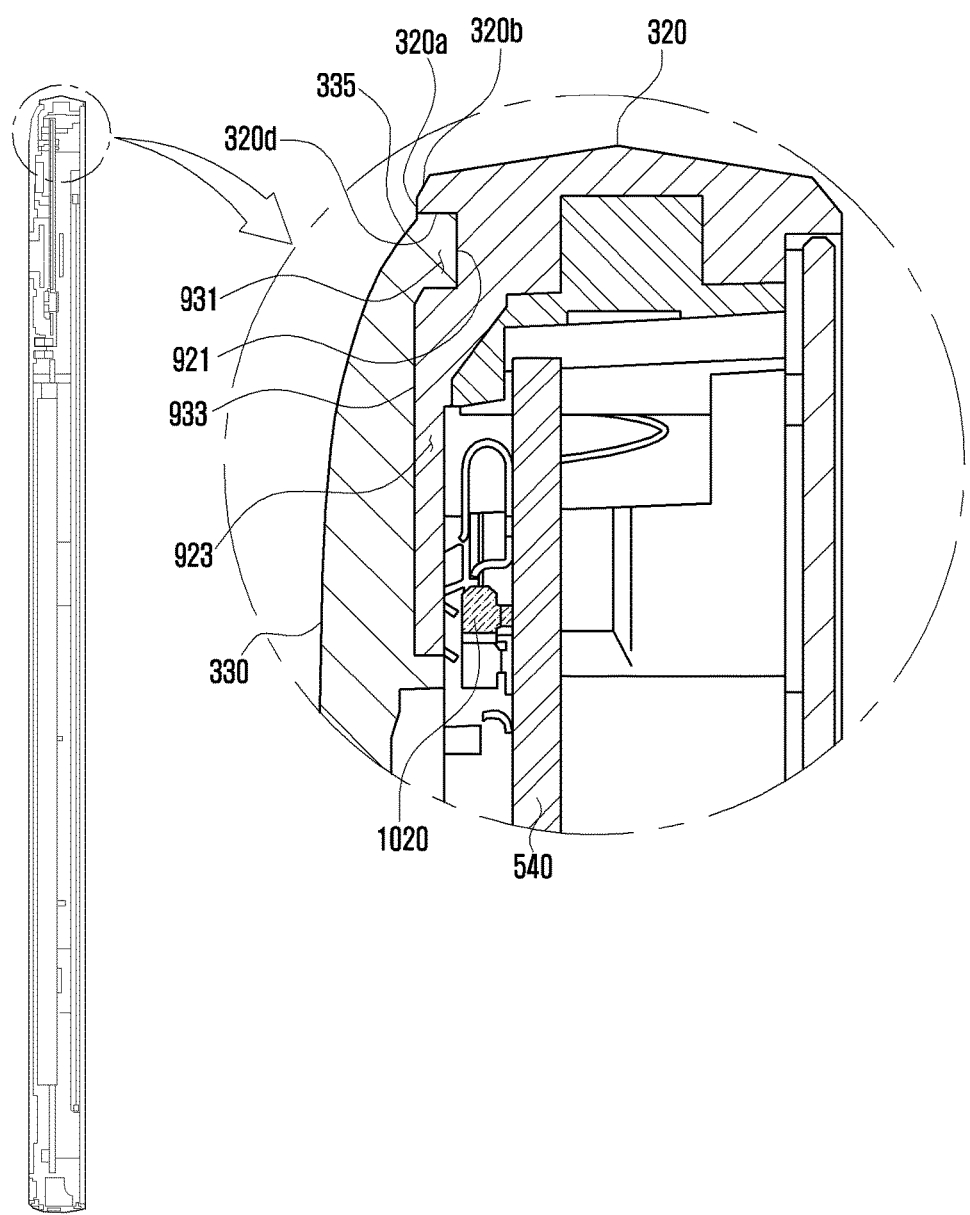
FIG. 12 is a cross-sectional view and a partially enlarged view illustrating a portion B-B of FIG. 11, according to an embodiment of the present disclosure.

FIG. 11 is a diagram illustrating a coupling state of a side surface and a rear surface of the electronic device 300, according to an embodiment of the present disclosure, and FIG. 12 is a cross-sectional view and an enlarged view illustrating a portion B-B of FIG. 11, according to an embodiment of the present disclosure.

With reference to FIGS. 11 and 12, an end surface of the edge portion 335 of the rear surface 330 may be made of metal, such as aluminum (AL) or AL alloy, to be disposed adjacent to the side surface 320 side that performs a function as an antenna of the electronic device. The side surface 320 may include the first surface 320*a* in which one end surface of the edge portion 335 of the rear surface 330 is bonded to an end surface thereof to have a straight line segment in a horizontal direction and an inclined surface 320*b* integrally extended from the first surface 320*a* to be cut by an external processing. When forming the inclined surface 320*b* by the external processing, in order to prevent damage of the rear surface 330 formed with, for example PC, the first surface 320*a* may be formed with a spare area for the external processing such as diamond cutting. After cutting by the external processing, the first surface 320*a* may have a width of approximately 0 mm-0.1 mm. The side surface 320 may include a second surface 320*d* formed substantially vertically to the first surface 320*a* and bonded to an end surface of the edge portion 335 of the rear surface 330.

A convex portion 931 may be formed at a periphery of an end surface of the edge portion 335 of the rear surface 330, and a recess portion 921 may be formed at the side surface 320 of a periphery bonded to an end surface of the edge portion 335 of the rear surface 330. A groove portion 933 may be formed At the inside of the convex portion 931 formed at a periphery of an end surface of the edge portion 335 of the rear surface 330, and a protrusion portion 923 may be formed to correspond to the groove portion 933 at the inside of the recess portion 921 formed at the side surface 320. The convex portion 931 formed at a periphery of an end surface of the edge portion 335 may be coupled at the recess portion 921 formed at the side surface 320. The protrusion portion 923 formed at the side surface 320 may be coupled at the groove portion 933 formed at the edge portion 335. That is, by alternately coupling a bonding portion in which an end portion of the edge portion 335 of the rear surface 330 and the inside of the side surface 320 meet to the convex portion 931, the protrusion portion 923, and the groove portion 933 through the recess portion 921, the side surface 320 and the rear surface 330 may not be separated easily. The side surface 320, which can be made of metal may form a structure that supports the rear surface 330, which may be made of a polymer material.

It may prove advantageous that the antenna ground portion 1010 within the housing 501 and/or the ground terminal 1020 of the PBA 540 are/is not exposed to an outer edge of the rear surface 330, which can be made of a polymer material. For example, when the antenna ground portion 1010 within the housing 501 and/or the ground terminal 1020 of the PBA 540 are/is exposed to an outer edge of the rear surface 330, in an exposure portion, a putty coating and a buffing process are, typically required; thus, production costs of the housing 501 may increase due to this extra processing step.

Figure 13:
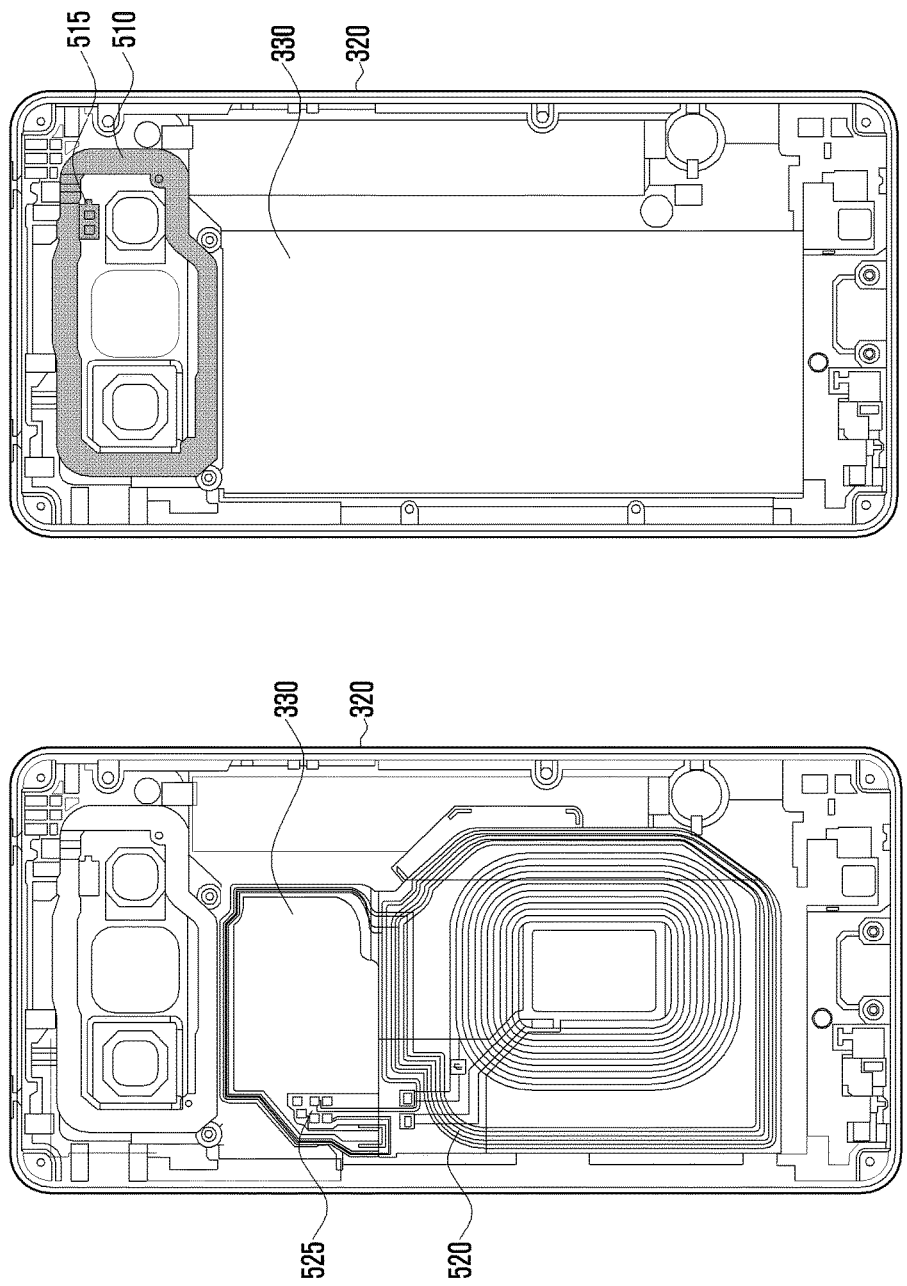
FIG. 13 is a diagram illustrating various antennas mounted within an electronic device housing, according to an embodiment of the present disclosure.

FIG. 13 is a diagram illustrating various antennas mounted within housing 501, according to an embodiment of the present disclosure.

With reference to FIG. 13, the GPS antenna 510 mounted at an upper portion of the rear surface 330 of the housing 501 may have a ground portion 515 at a predetermined location. The antenna module 520 mounted at a periphery of the center of the rear surface 330 of the housing 501 may have a ground portion 525 at a predetermined location. For example, when the antenna module 520 as a component is applied to the PBA 540, the antenna module 520 is in a state grounded to the PBA 540; thus, a separate ground portion may not be provided. The ground portion 515 of the GPS antenna 510 and the ground portion 525 of the antenna module 520 may contact the ground terminal 1020 of the PBA 540 of FIG. 12. A metal material is excluded from the rear surface 330 of the housing 501, and the rear surface 330 is formed with only a polymer material such as PC by injection molding; thus, a mounting area of internal antennas such as the GPS antenna 510 and the antenna module 520 becomes free and a performance of the antenna may not be deteriorated.

Figure 14:
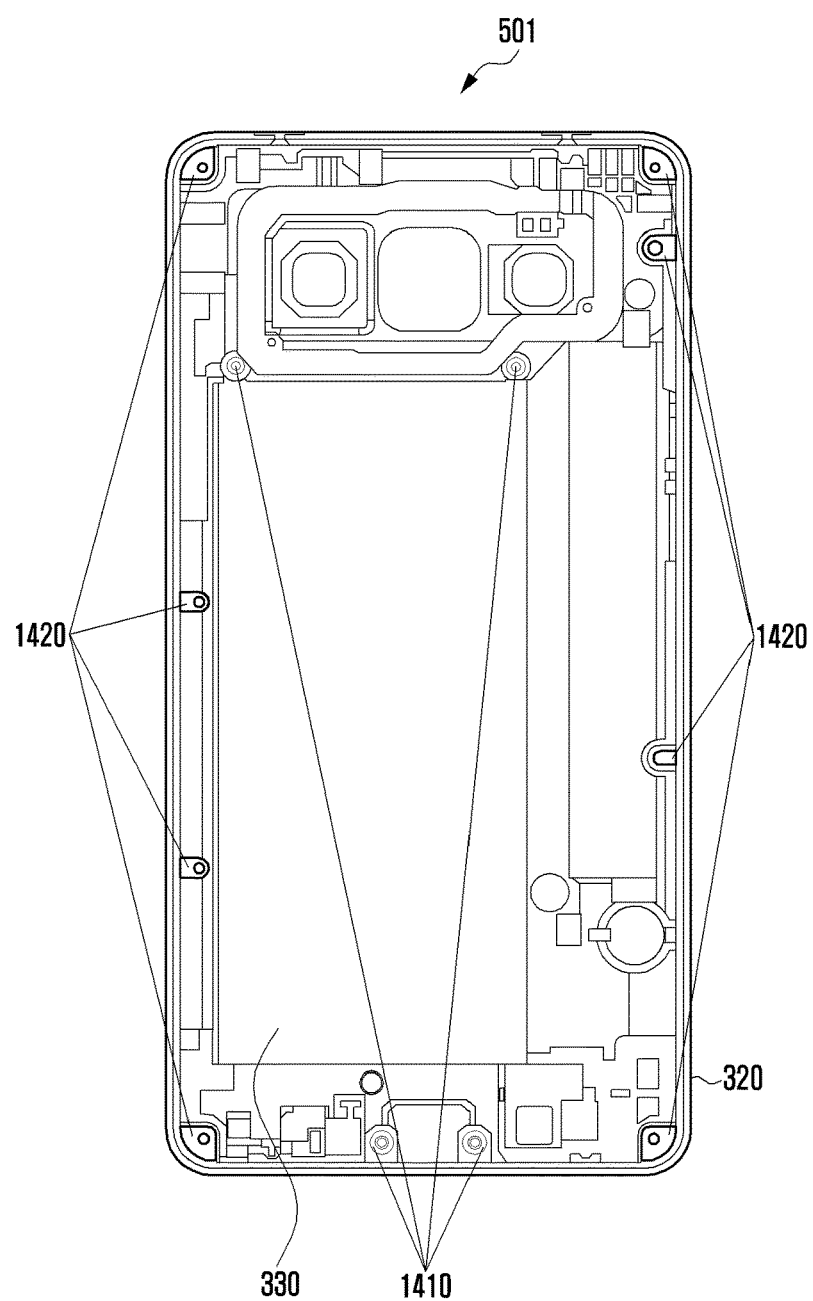
FIG. 14 is a diagram illustrating a state in which a screw insert is formed in an electronic device housing, according to an embodiment of the present disclosure.

FIG. 14 is a diagram illustrating a state in which a screw insert is formed in the housing 501, according to an embodiment of the present disclosure.

With reference to FIG. 14, in the housing 501, at least one screw insert 1410 may be provided by an insert injection method. The screw insert 1410 may be made of a brass material or other suitable material. Production costs of the housing with this method can be reduced compared with the method of forming a screw line through a separate screw tapping process after producing a housing of the electronic device. That is, when an injection mold is opened, the screw insert 1410 provided within the housing 501 and made of a brass material is inserted by an injection process of polymer resin injection, and the screw insert 1410 may be formed together and taken out. That is, the housing 501 and the screw insert 1410 may be formed simultaneously through one process. However, because a process of screw tapping 1420 applied to the conventional art requires a process of first forming the housing 501 and additionally forming a screw line, production times and material costs may increase due to this extra process.

Figure 15:
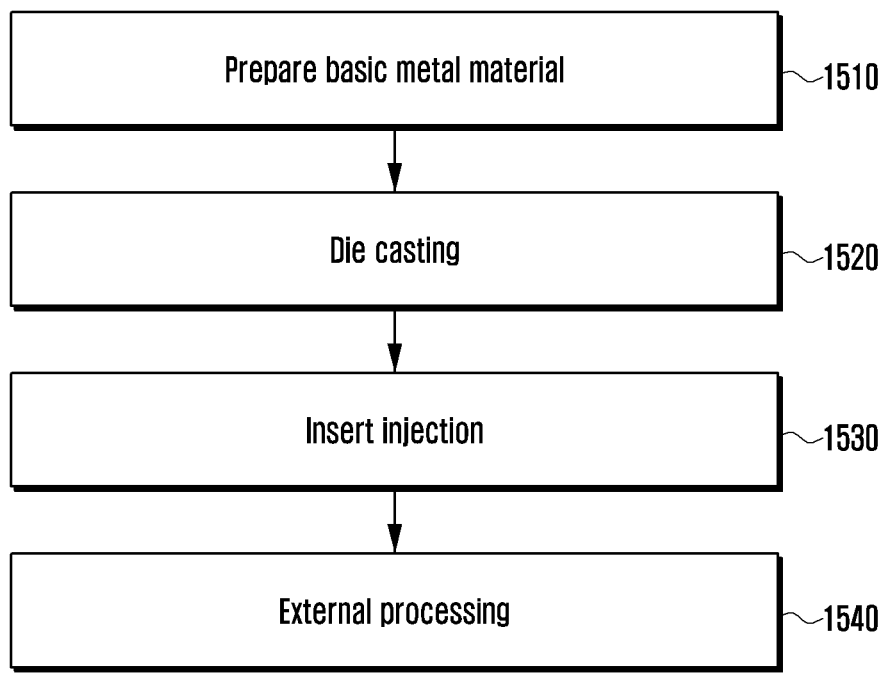
FIG. 15 is a flowchart of a method of manufacturing an electronic device housing, according to an embodiment of the present disclosure.

FIG. 15 is a flowchart illustrating a method of manufacturing housing 501, according to an embodiment of the present disclosure.

With reference to FIG. 15, a basic metal material such as AL or AL alloy is prepared at step 1510. By performing at least one of die casting, computerized numerical control (CNC), forging, rolling, welding, and drawing processes, a side housing 1620 of the electronic device 300, as illustrated in FIG. 16, may be formed at step 1520.

Figure 16:
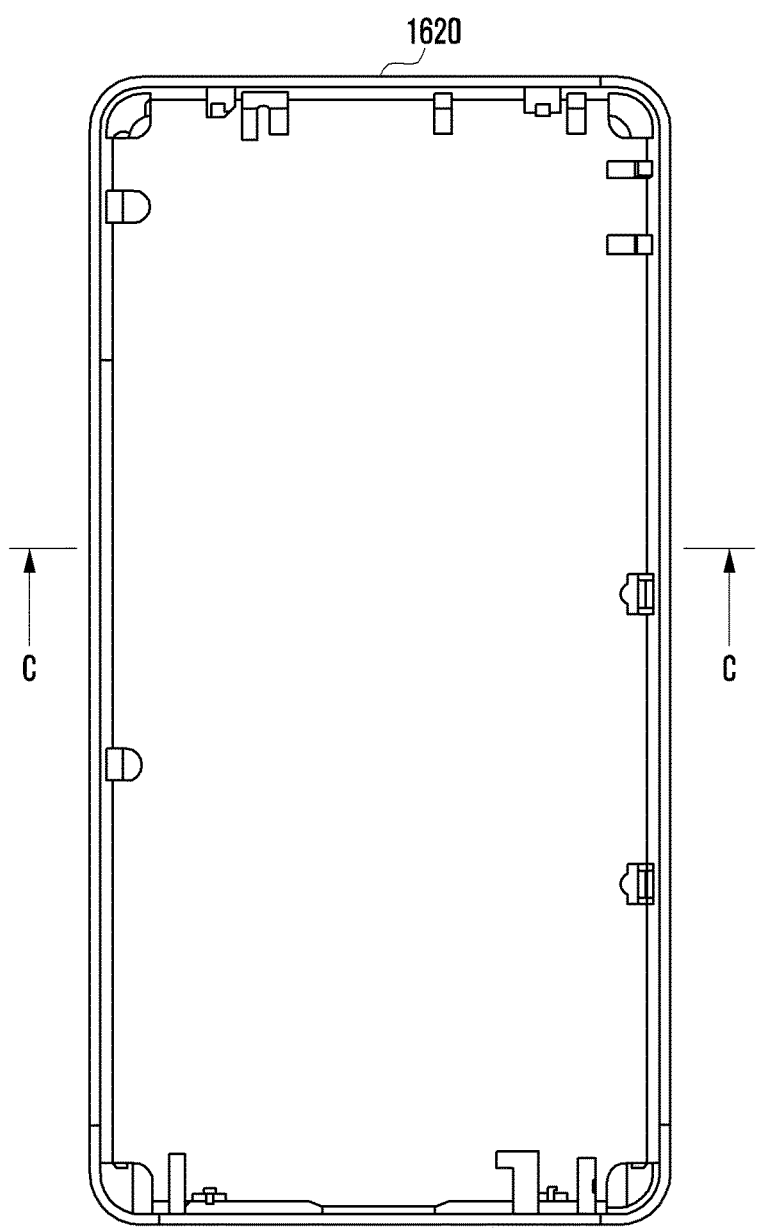
FIG. 16 is a diagram illustrating a side housing of an electronic device, according to an embodiment of the present disclosure.
Figure 17:
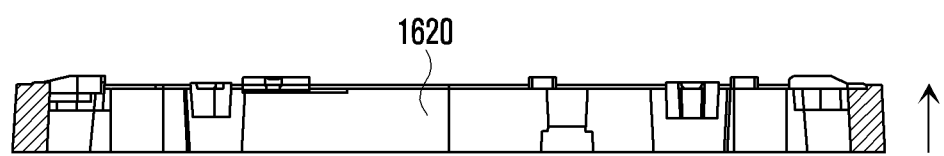
FIG. 17 is a cross-sectional view illustrating a portion C-C of FIG. 16, according to an embodiment of the present disclosure.

FIG. 16 is a diagram illustrating a side housing 1620 of the electronic device 300, according to an embodiment of the present disclosure. FIG. 17 is a cross-sectional view illustrating a portion C-C of FIG. 16, according to an embodiment of the present disclosure.

As shown in FIG. 17, a die casting process may include press, extrusion, rolling, and NC processes for producing the side housing 1620. Upon producing the side housing 1620 through a die casting process, a mold for the side housing 1620 may have a slope that may be extracted (or extended) in an upper direction.

Figure 19:
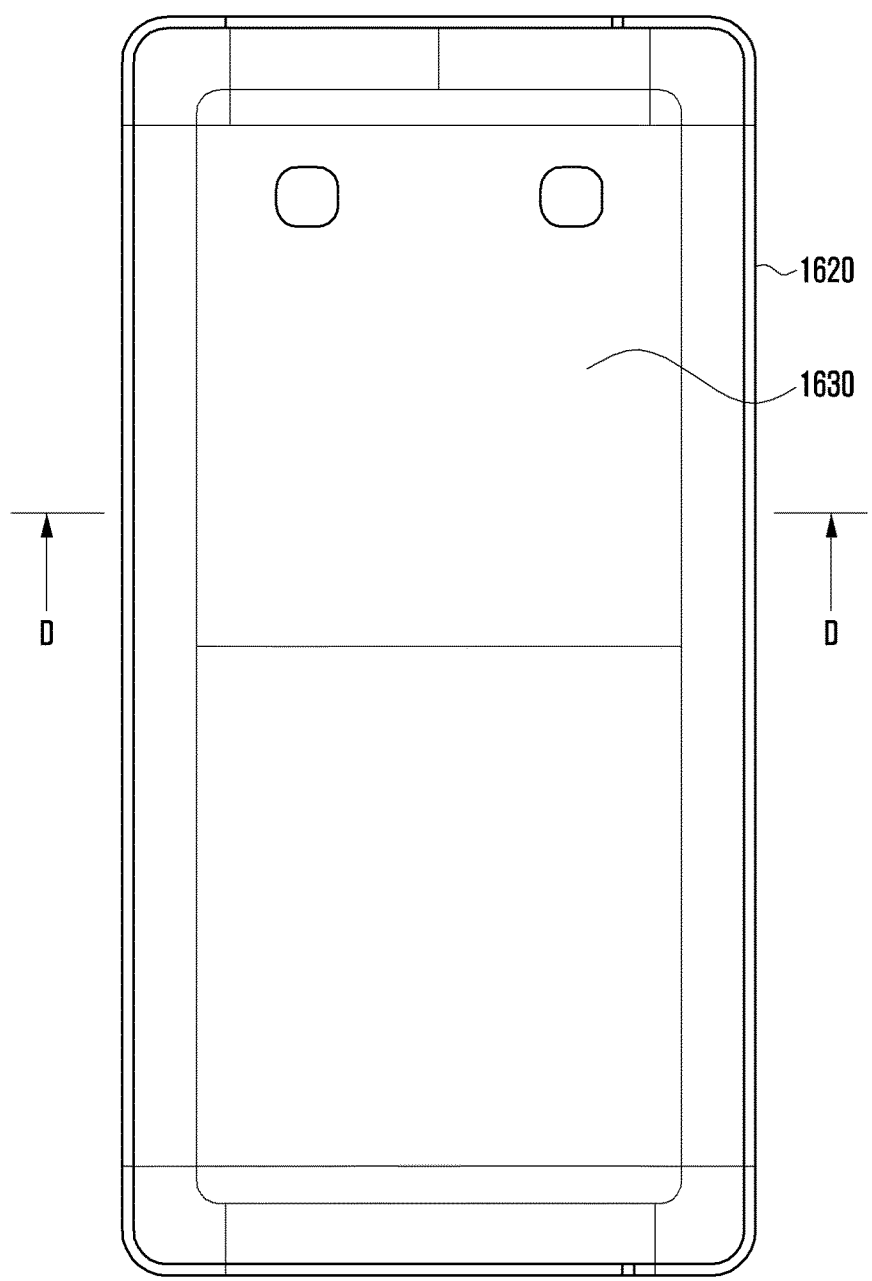
FIG. 19 is a diagram illustrating a state in which a side housing and a rear housing of an electronic device are integrally coupled, according to an embodiment of the present disclosure.

By performing an insert injection process, the side housing 1620 may be integrally formed with a rear housing 1630, as shown in FIG. 19, at step 1530. The side housing 1620 may be the side surface 320, and the rear housing 1630 may be the rear surface 330. By mounting the side housing 1620 produced through the die casting process of step 1520 within an injection mold and by injecting a polymer material into the injection mold, an insert injection process may be performed.

Figure 18:
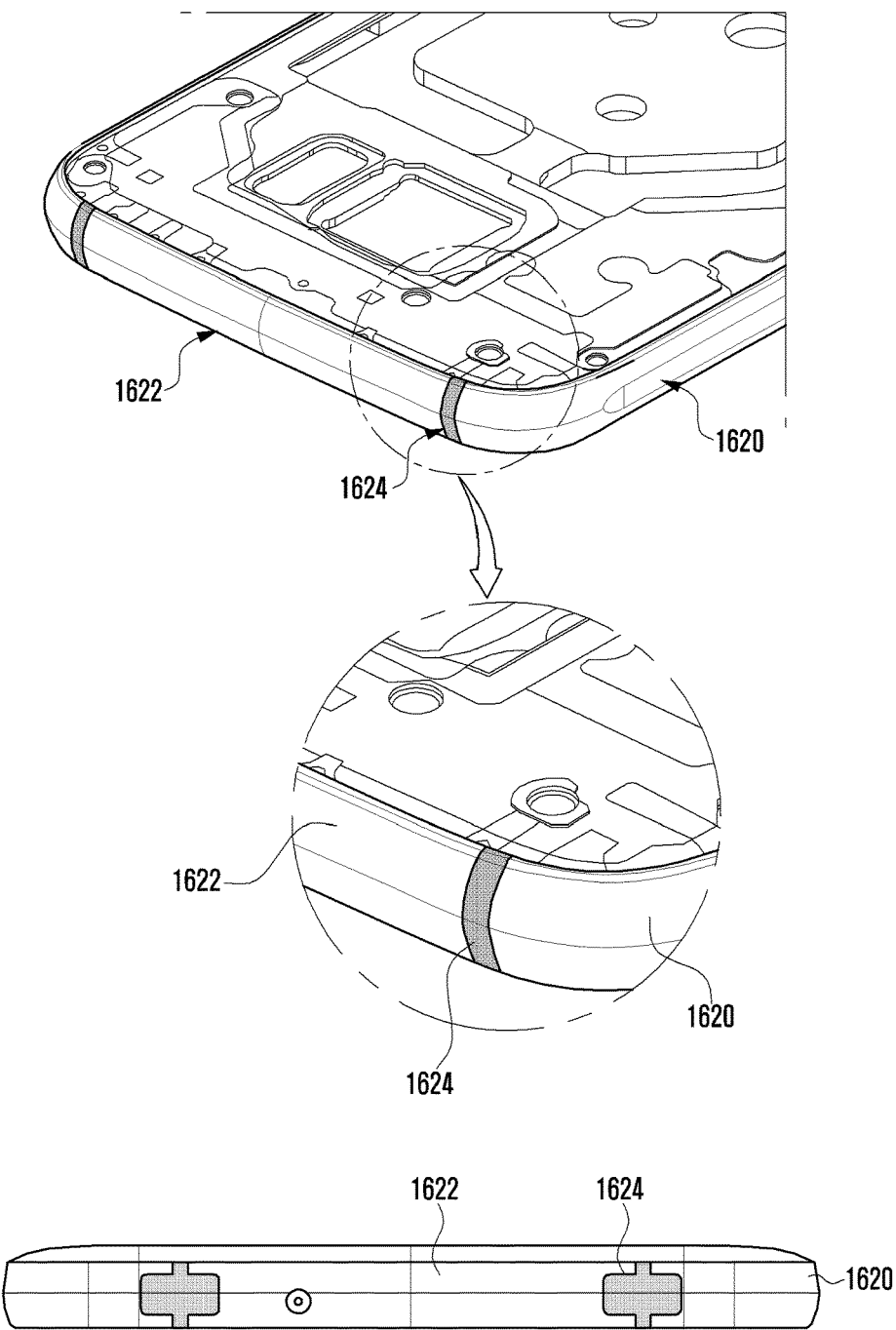
FIG. 18 is a diagram illustrating an insert injection process, which uses a resin in a side housing, according to an embodiment of the present disclosure.

The significance of using a resin with the insert injection process when manufacturing the side housing 1620, which can be made of metal, will be described with reference to FIG. 18. More particularly, when applying a metal housing to the electronic device 300 in which wireless communication is available, such as a smart phone and a tablet PC, a partial case 1622 of the side housing 1620 may be used as a portion of the antenna. Therefore, the partial case 1622 of the side housing 1620 should be electrically separated from the side housing 1620 through a non-conductive material. Further, in order to form one housing, the side housing 1620 and the partial case 1622 may be connected by a polymer resin 1624, which is the non-conductive material. When bonding the side housing 1620 and the partial case 1622 through the polymer resin 1624, if a bonding force is weak, the side housing 1620 and the partial case 1622 may be easily separated by an external impact. Therefore, for bonding strength of the side housing 1620 and the partial case 1622, the polymer resin 1624 may be a quadrangle having a wide width and may be formed in several shapes.

Figure 20:
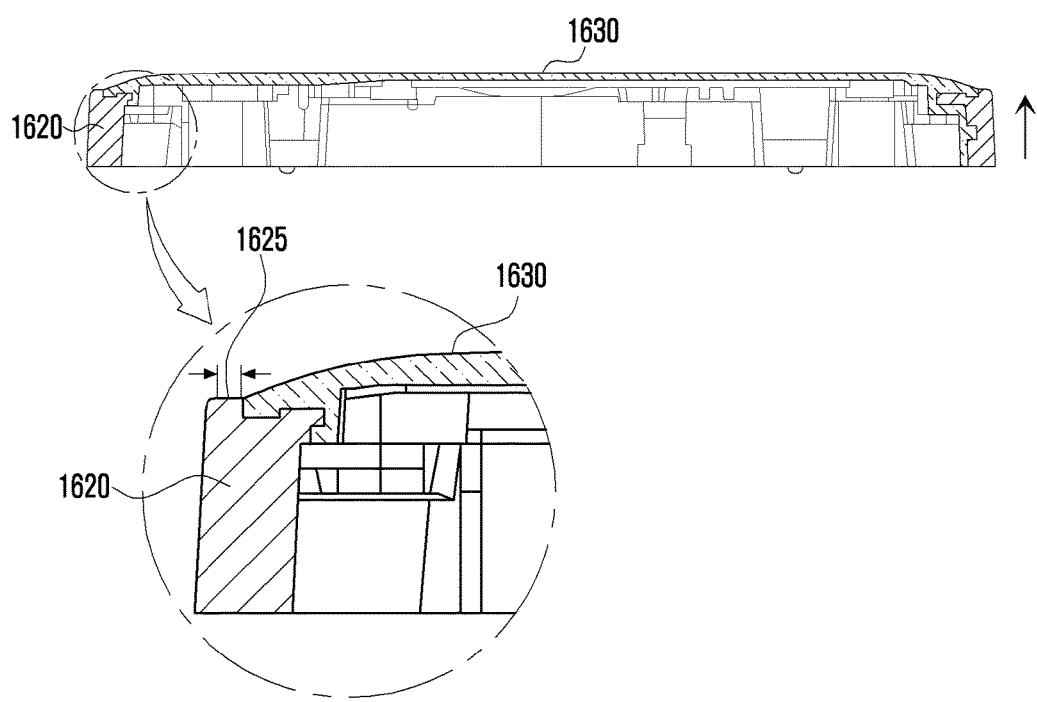
FIG. 20 is a cross-sectional view and a partially enlarged view illustrating a portion D-D of FIG. 19, according to an embodiment of the present disclosure.

FIG. 19 is a diagram illustrating a state in which the side housing 1620 and the rear housing 1630 of the electronic device 300 are integrally coupled, according to an embodiment of the present disclosure. FIG. 20 is a cross-sectional view and a partially enlarged view illustrating a portion D-D of FIG. 19, according to an embodiment of the present disclosure.

Upon performing an insert injection process, in order to prevent a polymer material such as PC that constitutes the rear housing 1630 from overflowing to the side housing 1620, at step 1530, an end portion of the side housing 1620 may have a predetermined straight line segment 1625. An outer surface of the side housing 1620, which can be made of metal, such as AL or AL alloy may have a slope that enables a mold to extracted in an upper direction.

By performing an external processing at a portion of the side housing 1620, as shown in FIGS. 9 and 12 and FIGS. 21 and 22, an inclined surface 320b having a slope of approximately 20°-70° may be formed at step 1540. The external processing is performed to enhance the aesthetic feeling of a design of the side housing 1620, and the side housing 1620 provides a slope for taking out the side housing 1620 from a mold. The external processing may be performed to reduce a distance between a display area and an outer edge of the electronic device 300 as well as the aesthetic feeling of a design of the electronic device 300. By performing diamond cutting together with the external processing, at an external exposure surface of the side housing 1620, an enhanced texture can also be achieved.

Figure 21:
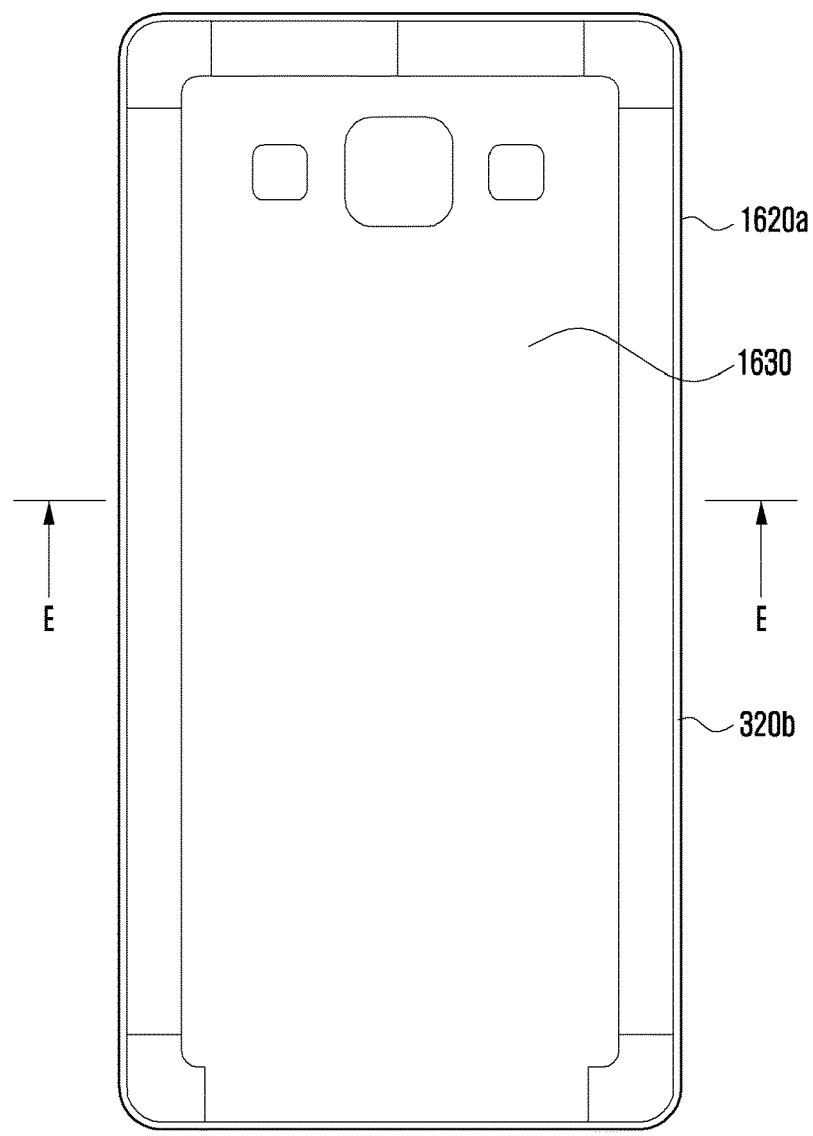
FIG. 21 is a diagram illustrating an inclined surface formed between a side housing and a rear housing of an electronic device, according to an embodiment of the present disclosure.
Figure 22:
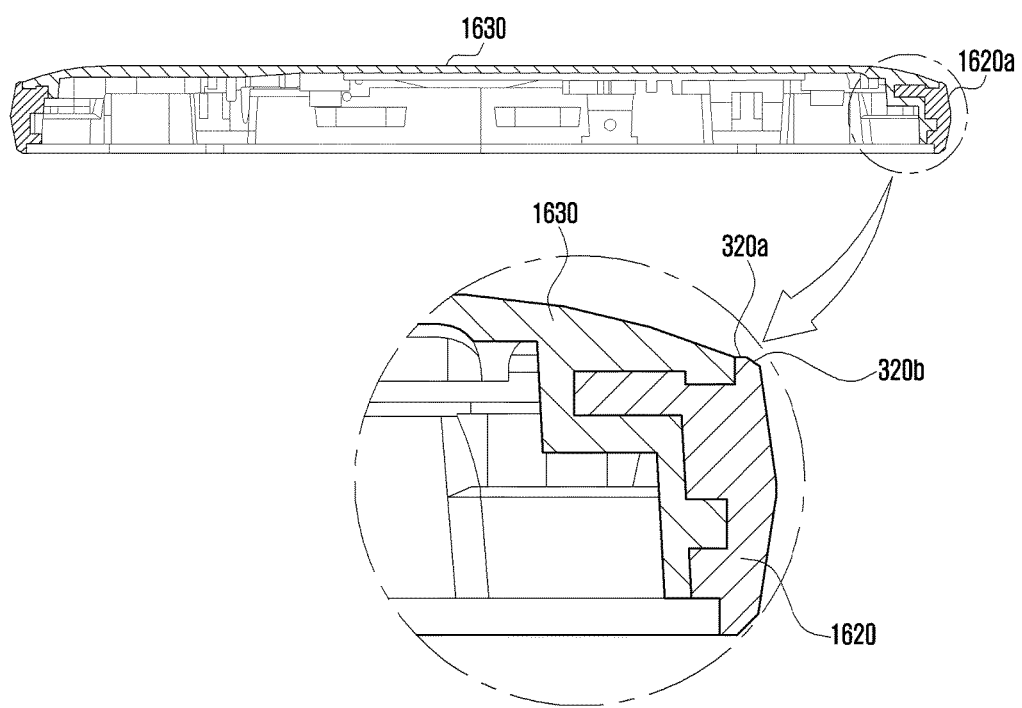
FIG. 22 is a cross-sectional view and a partially enlarged view illustrating a portion E-E of FIG. 21, according to an embodiment of the present disclosure.

FIG. 21 is a diagram illustrating an inclined surface formed between a side housing 1620 and a rear housing 1630 of an electronic device 300, according to an embodiment of the present disclosure. FIG. 22 is a cross-sectional view and a partially enlarged view illustrating a portion E-E of FIG. 21, according to an embodiment of the present disclosure.

At the inside of the inclined surface 320b formed at a portion of a side housing 1620a of an area in which the side housing 1620 and the rear housing 1630 bond, a similar first surface 320a with substantially a straight line may be formed. The first surface 320a has a width of approximately 0.1 mm-0.4 mm to prevent the rear housing 1630 from being damaged when an inclined surface 320b is formed by an external processing. The first surface 320a may be formed with a spare area for an external processing such as diamond cutting and may have a width of approximately 0 mm-0.1 mm after cutting by the external processing.

Therefore, for a bonding portion of the side housing 1620 and the rear housing 1630, conventional general putty coating and buffing processes are not performed, by performing only an external processing such as diamond cutting, production costs of the housing 501 can be reduced and productivity can be increased. Also, an electronic device housing having two colors and a unibody design that may represent an actual metal feeling can also be achieved.

In accordance with the present disclosure, by moving an end surface of a rear housing of the electronic devices described herein to a maximum, i.e., to an outermost edge of a side housing, a bonding portion (interface) can be formed, and, by cutting a spare area formed in a portion of a side housing of the bonding portion through an external processing, the housing of the electronic device can be produced.

That is, by removing a putty coating and a buffing process in a bonding portion of two kinds of materials as provided in the conventional art, production costs of the housing of the electronic device can be reduced, productivity can be increased, the bonding portion can be processed clearly, and an actual metal feeling can be implemented.

Further, by forming a side housing with a metal material such as aluminum (Al) or aluminum alloy and by forming an entire rear housing with a polymer material such as polycarbonate (PC), no metal material is present at a rear surface of the housing. Thus, a degree of freedom of mounting increases and, even if the internal antenna is located at any location within the electronic device, a reduction in antenna performance can be prevented.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

What is claimed is:

1. An electronic device including a display, the electronic device comprising: a first plate with a front surface facing in a first direction; a rear surface having a flat surface and an edge portion, the flat surface facing in a second direction opposite to the first direction and being at least partially formed of a polymer material, and the edge portion encloses the flat surface; a housing, which encloses a space between the front surface and the rear surface, that is at least partially formed of a metal material, and includes a side member with a side surface facing a third direction different from the first and second directions and that is integrally formed with the rear surface, wherein the side member has a portion adjacent to the edge portion of the rear surface, wherein the portion of the side member has a first surface substantially facing in the second direction in which the rear surface faces; and that contacts the edge portion of the rear surface, and wherein the portion of the side member has a second surface facing in a fourth direction different from the first direction, the second direction, and the third direction; and at a periphery of the end surface of the first plate, a convex portion is formed, and at a periphery of the side surface coupled to the end surface of the first plate, a recess portion is formed, at an inside of the convex portion formed at the first plate, a groove portion is formed, and at the inside of the recess portion formed at a side surface, a protrusion portion is formed corresponding to the groove portion, and the convex portion of the first plate is coupled to the recess portion formed at the side surface, and the protrusion portion of the side surface is coupled to the groove portion formed at the first plate.

2. The electronic device of claim 1, wherein the first surface forms an angle of 0° to 10° from the flat surface of the rear surface.

3. The electronic device of claim 1, wherein the first surface of the side member portion has a width of 0.1 mm to 0.4 mm.

4. The electronic device of claim 3, wherein the first surface of the side member portion comprises a spare area having a width of 0 mm-0.1 mm.

5. The electronic device of claim 1, wherein the fourth direction is a direction opposite to the first direction.

6. The electronic device of claim 1, wherein the polymer material is polycarbonate (PC).

7. The electronic device of claim 1, wherein the metal material comprises at least one of aluminum (Al) and Al alloy.

* * * * *